US007912230B2

(12) United States Patent
Kawamura et al.

(10) Patent No.: US 7,912,230 B2
(45) Date of Patent: Mar. 22, 2011

(54) HOWLING DETECTION DEVICE AND METHOD

(75) Inventors: Takashi Kawamura, Osaka (JP); Takeo Kanamori, Osaka (JP)

(73) Assignee: Panasonic Corporation, Osaka (JP)

( * ) Notice: Subject to any disclaimer, the term of this patent is extended or adjusted under 35 U.S.C. 154(b) by 1137 days.

(21) Appl. No.: 11/579,133

(22) PCT Filed: Jun. 15, 2005

(86) PCT No.: PCT/JP2005/010959
§ 371 (c)(1),
(2), (4) Date: Oct. 31, 2006

(87) PCT Pub. No.: WO2005/125273
PCT Pub. Date: Dec. 29, 2005

(65) Prior Publication Data
US 2008/0021703 A1 Jan. 24, 2008

(30) Foreign Application Priority Data
Jun. 16, 2004 (JP) ................................ 2004-177859

(51) Int. Cl.
*H04B 15/00* (2006.01)
*H04R 27/00* (2006.01)

(52) U.S. Cl. .......................................... 381/93; 381/83

(58) Field of Classification Search .................... 381/66, 381/83, 93, 95; 370/289; 379/406.01, 406.03; 455/570; 704/226, 233
See application file for complete search history.

(56) References Cited

U.S. PATENT DOCUMENTS 7,133,529 B2 * 11/2006 Ura ................................ 381/66
7,190,800 B2 * 3/2007 Terada et al. .................... 381/93
7,760,888 B2 * 7/2010 Kanamori et al. .............. 381/83

FOREIGN PATENT DOCUMENTS

JP 04-273642 9/1992
JP 04-277998 10/1992
JP 08-033091 2/1996
JP 08-223274 8/1996
JP 2002-223182 8/2002
JP 2002-237769 8/2002
JP 2003-250193 9/2003
JP 2003-284183 10/2003

* cited by examiner

*Primary Examiner* — Vivian Chin
*Assistant Examiner* — Kile Blair
(74) *Attorney, Agent, or Firm* — Wenderoth, Lind & Ponack, L.L.P.

(57) ABSTRACT

A howling detection device detects a dominance ratio, which indicates a risk of howling to occur when a mixed signal obtained by mixing a plurality of sound signals collected by a plurality of microphones is outputted by a speaker. The howling detection device detects levels of the plurality of sound signals, compares, in a same time domain, the mixed signal with a signal regarding a sound to be outputted by the speaker as a noise reference signal, detects a time period, as a word ending section, during which the mixed signal is inputted after the noise reference signal falls, and calculates a dominance ratio by extracting only a level of the plurality of sound signals corresponding to the word ending section and determining a ratio of each of the extracted levels of each of the sound signals to a sum of the extracted levels of the plurality of sound signals.

20 Claims, 15 Drawing Sheets

HOWLING DETECTION DEVICE AND METHOD

TECHNICAL FIELD

The present invention relates to a howling detection device and method. More particularly, the present invention relates to a howling detection device and method capable of detecting a risk of a howling occurrence, in a sound-intensifying system for mixing and intensifying a plurality of sound signals, for each of the plurality of sound signals.

BACKGROUND ART

Conventionally, in a sound-intensifying system for intensifying a sound signal collected by a microphone, a howling suppression device, for detecting an occurrence of howling and suppressing the howling, has been developed. As a conventional howling suppression device, a howling suppression device using an application filter or a notch filter is well-known (see patent document 1 and patent document 2, for example).

Hereinafter, with reference to FIG. 10, a sound-intensifying system, for receiving a plurality of sound signals, and mixing the plurality of sound signals to be intensified, in which the conventional howling suppression device is adopted, will be described. FIG. 10 is a view illustrating an exemplary configuration of a sound-intensifying system 9, for mixing and intensifying the plurality of sound signals, in which the howling suppression devices disclosed in patent document 1 and patent document 2 are adapted. Note that FIG. 10 shows the exemplary configuration of the sound-intensifying system 9 for suppressing howling to be occurred when a speaker and a plurality of microphone are in the same sound field. Here, as the plurality of sound signals, it is assumed that two sound signals are inputted from two microphones.

In FIG. 10, the sound-intensifying system 9 includes a first microphone 91*a*, a second microphone 91*b*, a sound characteristic adjusting section 92, a sound mixing section 93, a howling suppressing section 94, and a speaker 95. The sound characteristic adjusting section 92, to which a sound signal collected and generated by the first microphone 91*a* is inputted, adjusts a frequency and gain characteristic of the sound signal. Similarly, the sound characteristic adjusting section 92 adjusts a frequency and gain characteristic of a sound signal collected and generated by the second microphone 91*b*. Thereafter, each of the adjusted sound signals are mixed by the sound mixing section 93. Note that the sound characteristic adjusting section 92 and the sound mixing section 93 correspond to a commercially available mixer shown in FIG. 11, for example. FIG. 11 is a block diagram illustrating an exemplary configuration of the sound characteristic adjusting section 92 and the sound mixing section 93. In FIG. 11, the sound characteristic adjusting section 92 includes an equalizer 921*a*, an equalizer 921*b*, an amplification section 922*a*, and an amplification section 922*b*, for example. The equalizer 921*a* adjusts the frequency characteristic of the sound signal collected and generated by the first microphone 91*a*. The amplification section 922*a* adjusts the gain characteristic of the sound signal adjusted by the equalizer 921*a*. Similarly, the equalizer 921*b* and the amplification section 922*b* adjust the frequency characteristic and gain characteristic of the sound signal collected and generated by the second microphone 91*b*. As described above, similarly to the commercially available mixer, in the sound characteristic adjusting section 92, the frequency characteristic and gain characteristic of the sound signal collected by the first microphone 91*a* and the frequency characteristic and gain characteristic of the sound signal collected by the second microphone 91*b* are adjusted in an independent manner. The sound signal mixed by the sound mixing section 93 is inputted to the howling suppressing section 94.

The howling suppressing section 94 performs a signal processing on the sound signal mixed by the sound mixing section 93 so as to suppress howling. Thereafter, the sound signal on which the signal processing has been performed is amplified as necessary so as to be outputted by the speaker 95. Note that the howling suppressing section 94 corresponds to a howling suppression device for suppressing the howling. As described above, in this example, the sound-intensifying system adopts howling suppression methods disclosed in patent document 1 and patent document 2. Thus, an application filter or a notch filter is used as the howling suppressing section 94.

FIG. 12 is a block diagram illustrating an exemplary configuration of the howling suppressing section 94 in which an application filter 941 is used. In this case, based on the sound signal (the sound signal to be intensified) outputted from the howling suppressing section 94, the howling suppressing section 94 estimates, only when the sound signal is outputted therefrom, a transfer characteristic such as a spatial transfer characteristic. Thereafter, the application filter 941 multiplies the estimated transfer characteristic by the sound signal to be intensified, and subtracts the multiplied transfer characteristic from the sound signal outputted from the sound mixing section 93, thereby making it possible to suppress a howling occurrence.

Alternately, the notch filter may be used as the howling suppressing section 94. FIG. 13 is a view illustrating a change in a power spectrum X(ω) of the sound signal outputted from the sound mixing section 93 at a time of the howling occurrence. It is assumed that howling occurs, for example, at a specific frequency f. In this case, the power spectrum X(ω) shown in FIG. 13 changes such that power of the power spectrum rapidly increases at the specific frequency f. Therefore, a power difference between a frequency band and its adjacent frequency band is always monitored, thereby detecting that power in a frequency band including the specific frequency f is rapidly increased. That is, a frequency at which the howling occurs can be detected. In this case, a frequency to be attenuated by the notch filter is set at the specific frequency f. Then, the sound signal outputted from the sound mixing section 93 is passed through the notch filter which attenuates the sound signal at the specific frequency f, whereby the power at the specific frequency f is to be attenuated. As a result, a howling occurrence is to be suppressed.

[Patent document 1] Patent publication No. 2039846

[Patent document 2] Patent publication No. 2560923

DISCLOSURE OF THE INVENTION

Problems to be Solved by the Invention

With reference to FIG. 14, considered is an ideal transfer characteristic to be estimated by the howling suppressing section 94 in which the application filter is used. FIG. 14 is a schematic view illustrating characteristics of the respective elements, included in the sound-intensifying system 9 to which one signal is inputted, which are pertinent to the transfer characteristic. Firstly, it is assumed that the sound-intensifying system 9 has one microphone 91. In FIG. 14, a sound to be collected by the microphone 91 is denoted by S(ω), a sound signal collected and generated by the microphone 91 is denoted by X(ω), a frequency and gain characteristic adjusted by the sound characteristic adjusting section 92 is denoted by M(ω), the ideal transfer characteristic to be estimated by the howling suppressing section 94 is denoted by Hhat(ω), a sound signal outputted from the howling suppressing section 94 is denoted by Y(ω), and a spatial transfer characteristic from the speaker 95 to the microphone 91 is denoted by R(ω). In the above case, the sound signal X(ω) collected and generated by the microphone 91 is represented by formula (1).

[Formula 1]

$$X(\omega)=S(\omega)+R(\omega)*Y(\omega) \quad (1)$$

Note that R(ω) may include, in addition to the spatial transfer characteristic, a characteristic of the microphone 91, a characteristic of the speaker 95, an amplification characteristic of a sound signal amplified as necessary between an output of the howling suppressing section 94 and the speaker 95, and the like. In the howling suppressing section 94, a process, in which a sound signal M(ω)*X(ω) adjusted by the sound characteristic adjusting section 92 subtracts the transfer characteristic Hhat(ω) multiplied by the sound signal Y(ω) outputted from the howling suppressing section 94, is performed, thereby obtaining formula (2).

[Formula 2]

$$Y(\omega)=M(\omega)*X(\omega)-Hhat(\omega)*Y(\omega) \quad (2)$$

When formula (1) and formula (2) are deformed, formula (3) is obtained.

[Formula 3]

$$Y(\omega) = M(\omega)*S(\omega) + (M(\omega)*R(\omega) - Hhat(\omega))Y(\omega) \quad (3)$$

In formula (3), a second term thereof is pertinent to the howling occurrence. Therefore, the ideal transfer characteristic Hhat(ω) is a transfer characteristic which satisfies formula (4).

[Formula 4]

$$Hhat(\omega)\approx M(\omega)*R(\omega) \quad (4)$$

When the transfer characteristic Hhat(ω) satisfies formula (4), the second term of formula (3) will be substantially zero. Thus, the howling suppressing section 94 can suppress the howling occurrence.

Next, with reference to FIG. 15, considered is a case where a plurality of sound signals are mixed with each other. FIG. 15 is a schematic view illustrating characteristics of the respective elements, included in the sound-intensifying system 9 to which the plurality of sound signals are inputted, which are pertinent to the transfer characteristics. In FIG. 15, a sound to be collected by the first microphone 91*a* is denoted by S1(ω), a frequency and gain characteristic adjusted by the sound characteristic adjusting section 92 is denoted by M1(ω), a spatial transfer characteristic from the speaker 95 to the first microphone 91*a* is denoted by R1(ω). Similarly, a sound to be collected by a nth microphone is denoted by Sn(ω), a frequency and gain characteristic adjusted by the sound characteristic adjusting section 92 is denoted by Mn(ω), a spatial transfer characteristic from the speaker 95 to the nth microphone is denoted by Rn(ω). In this case, formula (3) is represented by formula (5). Note that n is a natural number and indicates the number of microphones.

[Formula 5]

$$Y(\omega) = \sum_{k=1}^{n} M_k(\omega)*S_k(\omega) + \left(\sum_{k=1}^{n} M_k(\omega)*R_k(\omega) - Hhat(\omega)\right)Y(\omega) \quad (5)$$

In formula (5), a second term thereof is pertinent to the howling occurrence. Therefore, the ideal transfer characteristic Hhat(ω) to be estimated is a transfer characteristic which satisfies formula (6).

[Formula 6]

$$Hhat(\omega) \approx \sum_{k=1}^{n} M_k(\omega)*R_k(\omega) \quad (6)$$

As shown in formula (6), a spatial transfer characteristic R(ω) of each of the plurality of sound signals is a unique value. Also, the spatial transfer characteristic R(ω) is a value which changes depending on a position of a microphone. That is, in order to appropriately estimate the ideal transfer characteristic, the spatial transfer characteristic R(ω) of each of the plurality of sound signals needs to be taken into consideration. In the conventional art, however, the transfer characteristic is estimated based on an output signal outputted from the howling suppressing section 94. That is, the output signal outputted from the howling suppressing section 94 is a signal generated based on the plurality of sound signals mixed with each other, and not a signal generated by taking account of the transfer characteristic R(ω) of each of the plurality of microphones. Therefore, in the conventional art, there has been a problem in that the transfer characteristic cannot be estimated at a speed corresponding to a change in the spatial transfer characteristic R(ω), whereby the howling occurrence cannot be appropriately suppressed.

Furthermore, as shown in formula (6), the ideal transfer characteristic Hhat(t) to be estimated is a value determined based on M(ω) and R(ω) of each of the plurality of microphones. That is, when M(ω) changes, the ideal transfer characteristic Hhat(ω) accordingly changes. In the application filter 941, the transfer characteristic is estimated, while being converged, based on the output signal outputted from the howling suppressing section 94. Therefore, if a rapid change occurs in M(ω), and then a rapid change accordingly occurs in the ideal transfer characteristic Hhat(ω), the transfer characteristic cannot be estimated at a speed corresponding to the changes, whereby it has been difficult to appropriately suppress the howling occurrence.

In the case where the plurality of microphones are provided, as described above, values, M(ω) and R(ω) are more easily changed than in the case where one microphone is provided. Therefore, the specific frequency f at which howling occurs is also to be more easily changed. Thus, in the case where the notch filter is used as the howling suppressing section 94, a frequency at which the notch filter attenuates cannot be set in accordance with the specific frequency f having been changed, whereby it has been difficult to appropriately suppress the howling occurrence.

As described above, in a sound-intensifying system for mixing and intensifying a plurality of sound signals, there has been a problem in that a howling occurrence cannot be appropriately suppressed unless a risk (changes in M(ω), R(ω), etc., for example) of a howling occurrence for each of the plurality of sound signals is taken into consideration.

Furthermore, when a user is warned of the howling occurrence in the conventional art, well-known is a method in which a power difference, between a frequency band and its adjacent frequency band, of a power spectrum of an inputted sound signal is always monitored, thereby detecting the howling occurrence so as to warn the user thereof. However, in a sound-intensifying system for mixing and intensifying a plurality of sound signals, the howling occurrence is detected based on a power spectrum of a mixed sound signal. Therefore, in the conventional art, among the plurality of sound signals inputted, any of the sound signals which has caused howling or which has a risk of a howling occurrence cannot be specified so as to issue a warning.

Therefore, an object of the present invention is to detect a risk of a howling occurrence, in a sound-intensifying system for mixing and intensifying a plurality of sound signals, for each of the plurality of sound signals. Furthermore, another object of the present invention is to estimate an optimal transfer characteristic based on information regarding the detected risk, thereby performing a robust suppression of the howling occurrence in accordance with the transfer characteristic rapidly changed by the sound characteristic adjusting section. Still furthermore, another object of the present invention is to provide a method for specifying, from among the plurality of sound signals inputted, any of the sound signals which has caused howling or which has the risk of the howling occurrence, so as to issue a warning.

Solution to the Problems

A first aspect of the present invention is directed to a howling detection device for detecting a dominance ratio, which indicates a risk of howling to be occurred when a mixed signal obtained by a sound mixing section for mixing a plurality of sound signals respectively collected by a plurality of microphones is outputted by a speaker, for each of the sound signals, the howling detection device comprises: a level detecting section for respectively detecting levels of the plurality of sound signals; a word ending detecting section for comparing, in a same time domain, the mixed signal with a signal regarding a sound to be outputted by the speaker as a noise reference signal, and detecting a time period, as a word ending section, during which the mixed signal is inputted after the noise reference signal falls; and a dominance ratio calculating section for extracting only a level of the word ending section from each of the levels of the plurality of sound signals, the levels detected by the level detecting section, and calculating, as a dominance ratio, a ratio of the extracted level of each of the sound signals to a sum of extracted levels of the plurality of sound signals.

In a second aspect of the present invention based on the first aspect, the howling detection device further comprises a howling suppressing section for subtracting from the mixed signal a signal having a same component as a signal included in the word ending section, based on a transfer characteristic calculated by using the dominance ratio, and outputting the obtained signal to the speaker.

In a third aspect of the present invention based on the second aspect, the howling suppressing section sets a function used for estimating the mixed signal excluding the signal having the same component as the signal included in the word ending section, updates the sum of the levels of the plurality of sound signals in accordance with the dominance ratio, and calculates the transfer characteristic by multiplying the function by a change rate of an updated sum of the levels of the plurality of sound signals to the sum of the levels of the plurality of sound signals.

In a fourth aspect of the present invention based on the third aspect, the howling suppressing section updates the sum of the levels of the plurality of sound signals by updating at least one of the levels of the sound signals, which indicates a relatively high dominance ratio.

In a fifth aspect of the present invention based on the third aspect, the howling suppressing section updates the sum of the levels of the plurality of sound signals by updating only one of the levels of the sound signals, which indicates the highest dominance ratio.

In a sixth aspect of the present invention based on the first aspect, the howling detection device further comprises a howling warning section for specifying at least one of the sound signals, which indicates a relatively high dominance ratio calculated by the dominance ratio calculating section, and notifying a user of the at least one of the sound signals.

In a seventh aspect of the present invention based on the first aspect, a howling warning section for specifying one of the sound signals, which indicates the highest dominant ratio calculated by the dominance ratio calculating section, and notifying a user of the one of the sound signals.

In an eighth aspect of the present invention based on the first aspect, the level detecting section detects the levels, of the plurality of sound signals, each of which is represented using a power spectrum.

A ninth aspect of the present invention is directed to a howling detection device for detecting a dominance ratio, which indicates a risk of howling to be occurred when a mixed signal obtained by a sound mixing section for mixing a plurality of sound signals respectively collected by a plurality of microphones is outputted by a speaker, for each of the sound signals, the howling detection device comprises: a level detecting section for respectively detecting levels of the plurality of sound signals; a howling occurrence detecting section for calculating a power spectrum of the mixed signal, and detecting a howling occurrence based on a change in the power spectrum; and a dominance ratio calculating section for extracting only a level of the word ending section from each of the levels of the plurality of sound signals, the levels detected by the level detecting section, and calculating, as a dominance ratio, a ratio of the extracted level of each of the sound signals to a sum of extracted levels of the plurality of sound signals.

In a tenth aspect of the present invention based on the ninth aspect, the howling detection device further comprises: a word ending detecting section for comparing, in a same time domain, the mixed signal with a sound signal to be outputted by the speaker as a noise reference signal, and detecting a time period, as a word ending section, during which the mixed signal is inputted after the noise reference signal falls; and a howling suppressing section for subtracting from the mixed signal a signal having a same component as a signal included in the word ending section, based on a transfer characteristic calculated by using the dominance ratio, and outputting the obtained signal to the speaker.

In an eleventh aspect of the present invention based on the tenth aspect, the howling suppressing section sets, when the word ending section is detected, a function used for estimating the mixed signal excluding the signal having the same component as the signal included in the word ending section, updates the sum of the levels of the plurality of sound signals in accordance with the dominance ratio, and calculates, when the howling occurrence is detected, the transfer characteristic by multiplying the function by a change rate of an updated sum of the levels of the plurality of sound signals to the sum of the levels of the plurality of sound signals.

In a twelfth aspect of the present invention based on the eleventh aspect, the howling suppressing section updates the sum of the levels of the plurality of sound signals by updating at least one of the levels of the sound signals, which indicates a relatively high dominance ratio.

In a thirteenth aspect of the present invention based on the eleventh aspect, the howling suppressing section updates the sum of the levels of the plurality of sound signals by updating only one of the levels of the sound signals, which indicates the highest dominance ratio.

In a fourteenth aspect of the present invention based on the ninth aspect, the howling detection device further comprises a howling warning section for specifying at least one of the sound signals, which indicates a relatively high dominance ratio calculated by the dominance ratio calculating section, and notifying a user of the at least one of the sound signals.

In a fifteenth aspect of the present invention based on the ninth aspect, the howling detection device further comprises a howling warning section for specifying one of the sound signals, which indicates the highest dominant ratio calculated by the dominance ratio calculating section, and notifying a user of the one of the sound signals.

In a sixteenth aspect of the present invention based on the ninth aspect, the level detecting section detects the levels, of the plurality of sound signals, each of which is represented using a power spectrum.

A seventeenth aspect of the present invention is directed to a howling detection method for detecting a dominance ratio, which indicates a risk of howling to be occurred when a mixed signal obtained by a sound mixing section for mixing a plurality of sound signals respectively collected by a plurality of microphones is outputted by a speaker, for each of the sound signals, the howling detection method comprises: a level detecting step for respectively detecting levels of the plurality of sound signals; a word ending detecting step for comparing, in a same time domain, the mixed signal with a signal regarding a sound to be intensified as a noise reference signal, and detecting a time period, as a word ending section, during which the mixed signal is inputted after the noise reference signal falls; and a dominance ratio calculating step for extracting only a level of the word ending section from each of the levels of the plurality of sound signals, the levels detected by the level detecting section, and calculating, as a dominance ratio, a ratio of the extracted level of each of the sound signals to a sum of extracted levels of the plurality of sound signals.

An eighteenth aspect of the present invention is directed to a howling detection method for detecting a dominance ratio, which indicates a risk of howling to be occurred when a mixed signal obtained by a sound mixing section for mixing a plurality of sound signals respectively collected by a plurality of microphones is outputted by a speaker, for each of the sound signals, the howling detection method comprises: a level detecting step for respectively detecting levels of the plurality of sound signals; a howling occurrence detecting step for calculating a power spectrum of the mixed signal, and detecting a howling occurrence based on a change in the power spectrum; and a dominance ratio calculating step for extracting only a level of the word ending section from each of the levels of the plurality of sound signals, the levels detected by the level detecting section, and calculating, as a dominance ratio, a ratio of the extracted level of each of the sound signals to a sum of extracted levels of the plurality of sound signals.

EFFECT OF THE INVENTION

According to the aforementioned first aspect, the word ending section includes only a signal component which causes the howling occurrence, and the dominance ratio is calculated by using the level of the word ending section, thereby making it possible to detect the risk indicating a sound signal which is likely to cause a howling occurrence among the plurality of sound signals. Furthermore, the dominance ratio is calculated based on the level of each of the sound signals before being mixed by the sound mixing section. Therefore, according to the first aspect, before the plurality of sound signals are mixed by the sound mixing section, even if changes in frequency characteristics and/or gain characteristics of a plurality of the sound signals occur, for example, the risk can be detected in accordance with the changes.

According to the aforementioned second aspect, the transfer characteristic is calculated by using the dominance ratio, thereby making it possible to perform a howling suppression in accordance with the risk indicating a sound signal which is likely to cause the howling occurrence among the plurality of sound signals. Furthermore, the transfer characteristic is calculated by using the dominance ratio. Thus, before the plurality of sound signals are mixed by the sound mixing section, even if changes in frequency characteristics and/or gain characteristics of a plurality of the sound signals occur, and rapid changes in the transfer characteristics of the sound signals accordingly occur, for example, a robust howling suppression can be performed in accordance with the changes.

According to the aforementioned third aspect, the transfer characteristic is calculated based on the change rate, of the sum of the levels of the sound signals, which corresponds to the dominance ratio, thereby making it possible to realize the robust howling suppression while taking account of risks indicating a plurality of the sound signals which are likely to cause the howling occurrence.

According to the aforementioned fourth aspect, the transfer characteristic is calculated so as to correspond to the at least one of the plurality of sound signals which has a relatively high risk of the howling occurrence, thereby making it possible to realize a high-efficiency howling suppression.

According to the aforementioned fifth aspect, the transfer characteristic is calculated so as to correspond to one of the plurality of sound signals which has the highest risk of the howling occurrence, thereby making it possible to realize a high-efficiency howling suppression. For example, because it is rare that levels of a plurality of sound signals are simultaneously changed when the user performs a mixing operation, the robust howling suppression can be performed even if the transfer characteristic is calculated only in accordance with the highest dominance ratio.

According to the aforementioned sixth aspect, the at least one of the sound signals, which has a relatively high dominance ratio, is specified, thereby making it possible to notify the user of the at least one of the plurality of sound signals which has a relatively high risk of a howling occurrence. Furthermore, even when the user performs a mixing operation on a plurality of sound signals to be collected, for example, he or she can perform the operation by referring to the risk for each of the sound signals so as to prevent a howling occurrence.

According to the aforementioned seventh aspect, one of the sound signals, which has the highest dominance ratio, is specified, thereby making it possible to notify the user of the one of the plurality of sound signals which has the highest risk of a howling occurrence. Furthermore, even when the user performs a mixing operation on a plurality of sound signals to be collected, he or she can perform the operation by referring to the risk for each of the sound signals so as to prevent a howling occurrence.

According to the aforementioned eighth aspect, the level of each of the plurality of sound signals is represented using the power spectrum, thereby making it possible to detect the risk of the howling occurrence for each frequency band.

According to the aforementioned ninth aspect, when howling occurs, it is possible to detect the risk indicating a sound signal which is likely to cause the howling occurrence among the plurality of sound signals. Furthermore, the dominance ratio is calculated based on the levels of the sound signals before being mixed by the sound mixing section. Therefore, according to the present invention, before the sound signals are mixed by the sound mixing section, even if changes in frequency characteristics and/or gain characteristics of a plurality of the sound signals occur, and changes in the transfer characteristics of the sound signals accordingly occur, for example, the risk can be detected in accordance with the changes.

According to the aforementioned tenth aspect, the transfer characteristic is calculated by using the dominance ratio, thereby making it possible to perform a howling suppression in accordance with the risk indicating a sound signal which is likely to cause the howling occurrence among the plurality of sound signals. Furthermore, the transfer characteristic is calculated by using the dominance ratio. Thus, before the plurality of sound signals are mixed by the sound mixing section, even if rapid changes in frequency characteristics and/or gain characteristics of a plurality of the sound signals occur, and changes in the transfer characteristics of the sound signals accordingly occur, for example, a robust howling suppression can be performed in accordance with the changes.

According to the aforementioned eleventh aspect, the transfer characteristic is calculated based on the change rate, of the sum of the levels of the sound signals, which corresponds to the dominance ratio, thereby making it possible to realize, before the word ending section is detected, the robust howling suppression while taking account of risks indicating a plurality of sound signals which are likely to cause the howling occurrence.

According to the aforementioned twelfth aspect, the transfer characteristic is calculated so as to correspond to any of the plurality of sound signals, which has a relatively high risk of the howling occurrence, thereby making it possible to realize a high-efficiency howling suppression.

According to the aforementioned thirteenth aspect, the transfer characteristic is calculated so as to correspond to one of the plurality of sound signals which has the highest risk of the howling occurrence, thereby making it possible to realize a high-efficiency howling suppression. For example, because it is rare that levels of a plurality of sound signals are simultaneously changed when the user performs a mixing operation, a robust howling suppression can be performed even if the transfer characteristic is calculated only in accordance with the highest dominance ratio.

According to the aforementioned fourteenth aspect, when howling occurs, it is possible to notify the user of any of the plurality of sound signals which has a relatively high risk of a howling occurrence. Furthermore, even when the user performs a mixing operation on a plurality of sound signals to be collected, he or she can perform the operation by referring to the risk for each of the sound signals so as to prevent a howling occurrence.

According to the aforementioned fifteenth aspect, when howling occurs, it is possible to notify the user of one of the plurality of sound signals which has the highest risk of a howling occurrence. Furthermore, even when the user performs a mixing operation on a plurality of sound signals to be collected, he or she can perform the operation by referring to the risk for each of the sound signals so as to prevent a howling occurrence.

According to the aforementioned sixteenth aspect, the level of each of the plurality of sound signals is represented using the power spectrum, thereby making it possible to detect the risk of the howling occurrence for each frequency band.

DESCRIPTION OF THE REFERENCE CHARACTERS

Figure 1:
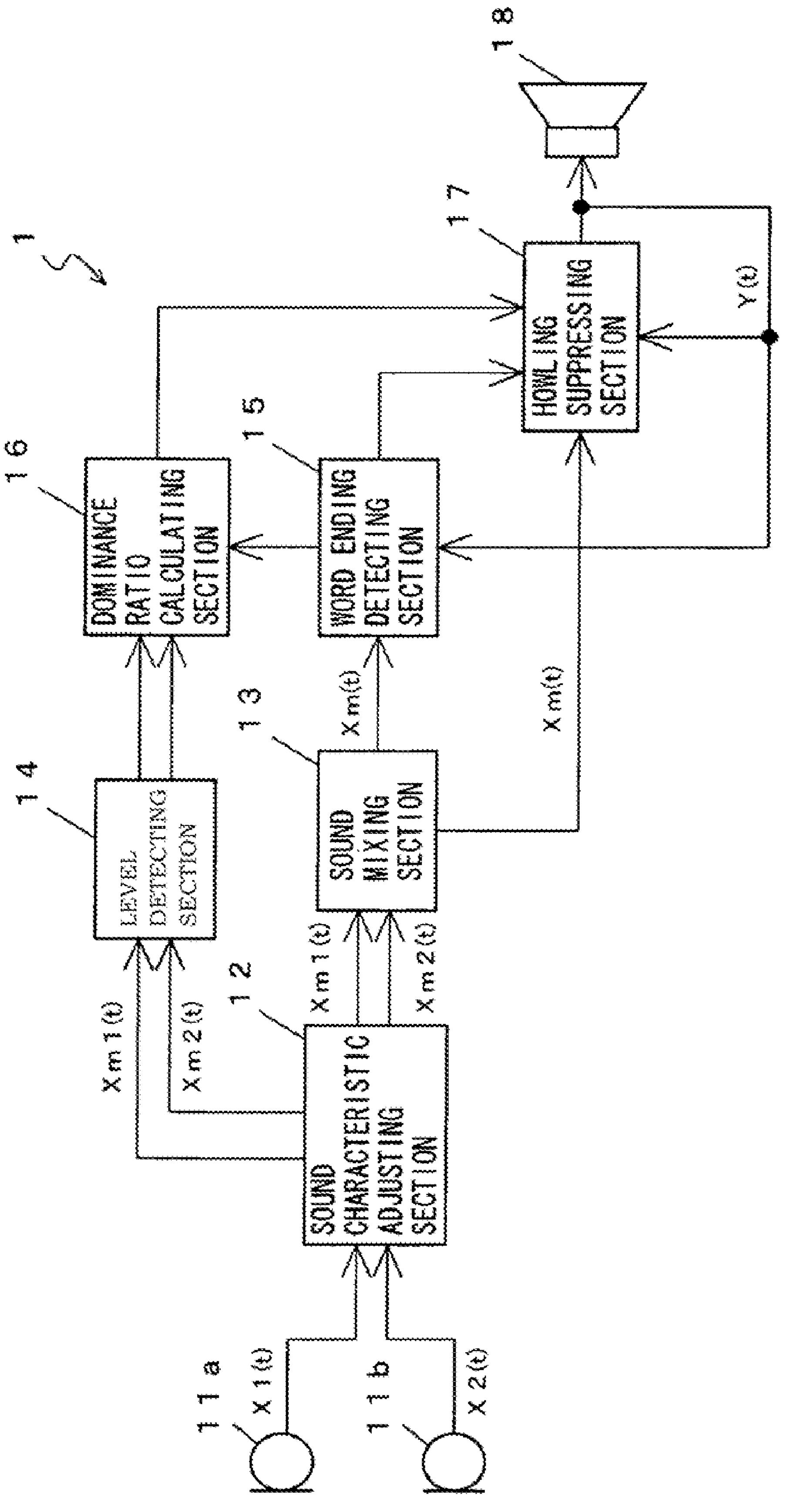
FIG. 1 is a block diagram illustrating an exemplary configuration of a sound-intensifying system 1.

1, 2 sound-intensifying system
3 howling warning device
11*a* first microphone
11*b* second microphone
12 sound characteristic adjusting section
13 sound mixing section
14 level detecting section
15, 176 word ending detecting section
16 dominance ratio calculating section
17, 22 howling suppressing section
18 speaker
21 howling occurrence detecting section
31 howling warning section

121 equalizer
122 amplification section
171 first power spectrum calculating section
172 second power spectrum calculating section
173 transfer characteristic calculating section
174 inverse fourier transforming section
175 convolution section

BEST MODE FOR CARRYING OUT THE INVENTION

First Embodiment

With reference to FIG. 1, a sound-intensifying system 1, in which a howling detection method and howling suppression method according to a first embodiment of the present invention are adapted, will be described. FIG. 1 is a block diagram illustrating an exemplary configuration of the sound-intensifying system 1. In FIG. 1, the sound-intensifying system 1 includes a first microphone 11*a*, a second microphone 11*b*, a sound characteristic adjusting section 12, a sound mixing section 13, a level detecting section 14, a word ending detecting section 15, a dominance ratio calculating section 16, a howling suppressing section 17, and a speaker 18. Note that the sound-intensifying system 1 may be a system for intensifying a sound by means of three or more microphones. However, in the present embodiment, it is assumed that the sound-intensifying system 1 intensifies the sound by means of two microphones. In FIG. 1, the first microphone 11*a* collects a sound to be outputted by the speaker 18, and generates a sound signal. The sound signal generated by the first microphone 11*a* is denoted by X1(*t*). Similarly, the second microphone 11*b* collects a sound to be intensified, and generates a sound signal X2(*t*).

The sound signals X1(*t*) and X2(*t*) are inputted to the sound characteristic adjusting section 12. The sound characteristic adjusting section 12 adjusts a frequency and gain characteristic of each of the sound signals. Note that the sound signal X1(*t*) adjusted by the sound characteristic adjusting section 12 is denoted by Xm1(*t*). Similarly, the sound signal X2 adjusted by the sound characteristic adjusting section 12 is denoted by Xm1(*t*). The sound signals Xm1(*t*) and Xm2(*t*) adjusted by the sound characteristic adjusting section 12 are outputted to the level detecting section 14 and the sound mixing section 13. The sound signals Xm1(*t*) and Xm2(*t*) inputted to the sound mixing section 13 are mixed by the sound mixing section 13. The mixed sound signal is denoted by Xm(t). Thereafter, the sound signal Xm(t) mixed by the sound mixing section 13 is outputted to the word ending detecting section 15 and the howling suppressing section 17. Note that the sound characteristic adjusting section 12 and the sound mixing section 13 correspond to a commercially available mixer shown in FIG. 2, for example.

Figure 2:
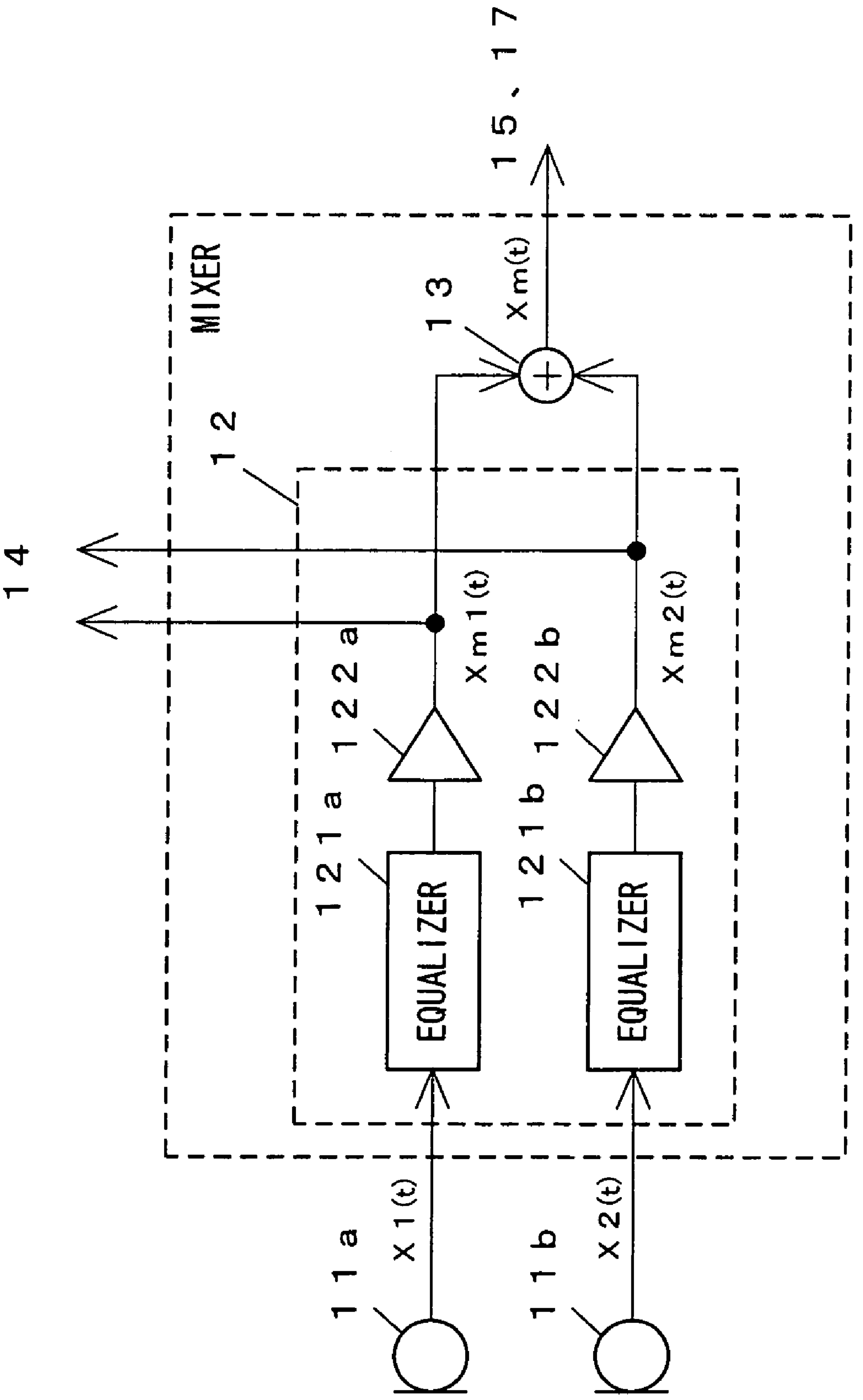
FIG. 2 is a block diagram illustrating an exemplary configuration of a sound characteristic adjusting section 12 and a sound mixing section 13.

FIG. 2 is a block diagram illustrating an exemplary configuration of the sound characteristic adjusting section 12 and the sound mixing section 13. In FIG. 2, the sound characteristic adjusting section 12 includes an equalizer 121*a*, an equalizer 121*b*, an amplification section 122*a*, and an amplification section 122*b*, for example. The equalizer 121*a* adjusts the frequency characteristic of the sound signal X1(*t*) collected and generated by the first microphone 11*a*. The amplification section 122*a* adjusts the gain characteristic of the sound signal adjusted by the equalizer 121*a*. Similarly, the equalizer 121*b* and the amplification section 122*b* respectively adjust the frequency characteristic and the gain characteristic of the sound signal X2(*t*) collected and generated by the second microphone 11*b*. As described above, similarly to the commercially available mixer, in the sound characteristic adjusting section 12, the frequency characteristic and gain characteristic of the sound signal collected by the first microphone 11*a* and the frequency characteristic and gain characteristic of the sound signal collected by second microphone 11B are adjusted in an individual manner.

The level detecting section 14 detects a level of each of the sound signals Xm1(*t*) and Xm2(*t*) outputted from the sound characteristic adjusting section 12. As a specific detection method, for example, a power spectrum is calculated at a predetermined time interval, thereby detecting a level of each of the sound signals for each frequency band. All information regarding the level, for each frequency band, detected by the level detecting section 14 at the predetermined time interval is outputted to the dominance ratio calculating section 16.

Based on the sound signal Xm(t) inputted from the sound mixing section 13 and a noise reference signal Y(t), the word ending detecting section 15 detects a delay section, as a word ending, which is a time difference between a sound section of the noise reference signal Y(t) and a sound section of the sound signal Xm(t). Note that the noise reference signal Y(t) is a signal regarding a sound to be outputted by a speaker. For example, the noise reference signal Y(t) is a sound signal obtained immediately before being outputted by the speaker 18. In this case, the noise reference signal Y(t) obtained immediately before being inputted to the speaker 18 is inputted to the howling suppressing section 17. Alternately, the noise reference signal Y(t) may be a sound signal in which a sound outputted in a close proximity of the speaker 18 is collected and generated by another microphone or the like. In this case, the howling suppressing section 17 is connected to the said another microphone, and a sound signal outputted from the said another microphone is inputted to the howling suppressing section 17 as the noise reference signal Y(t).

Figure 3:
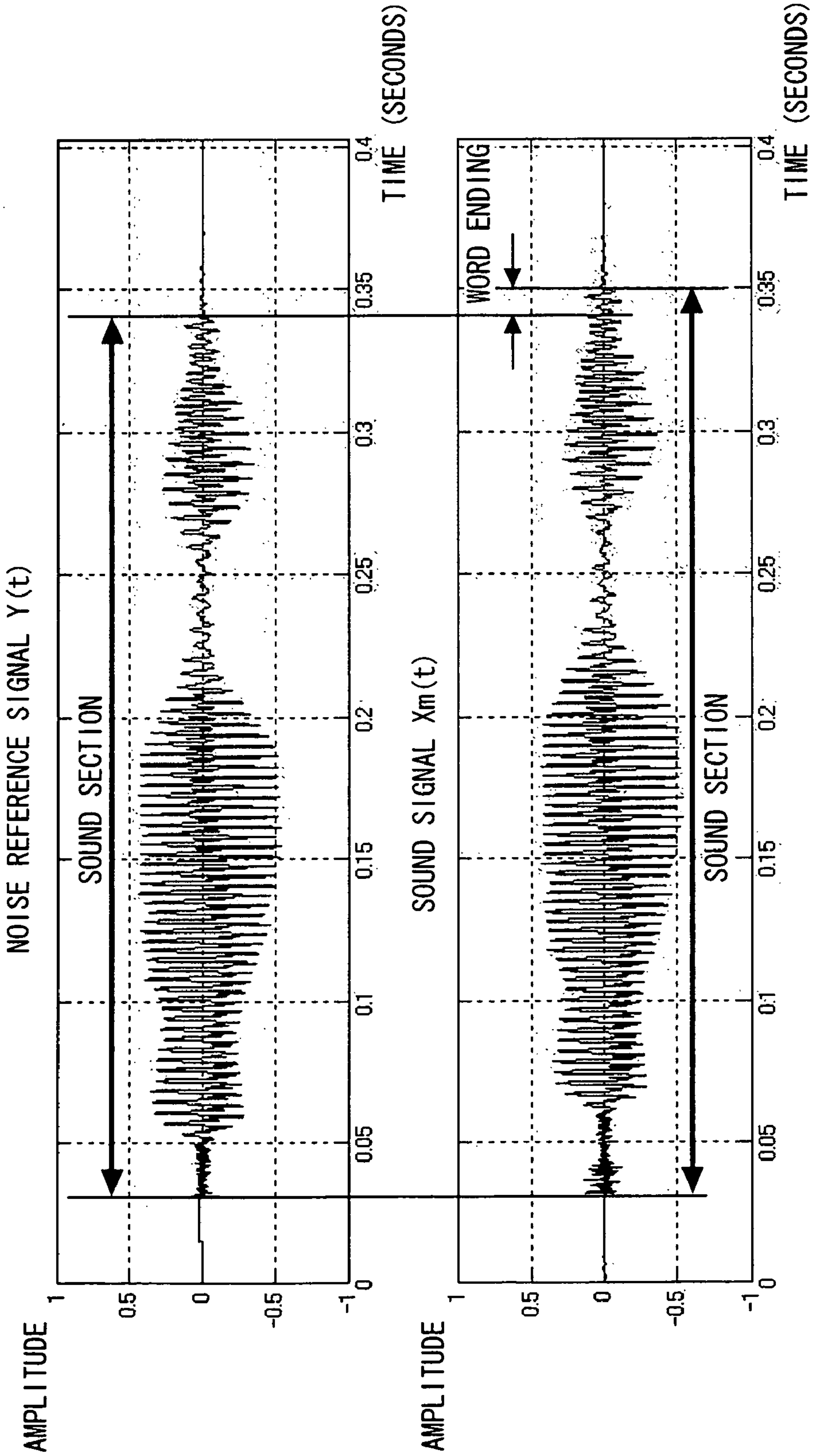
FIG. 3 are diagrams illustrating waveforms of a noise reference signal Y(t) and a sound signal Xm(t).
Figure 13:
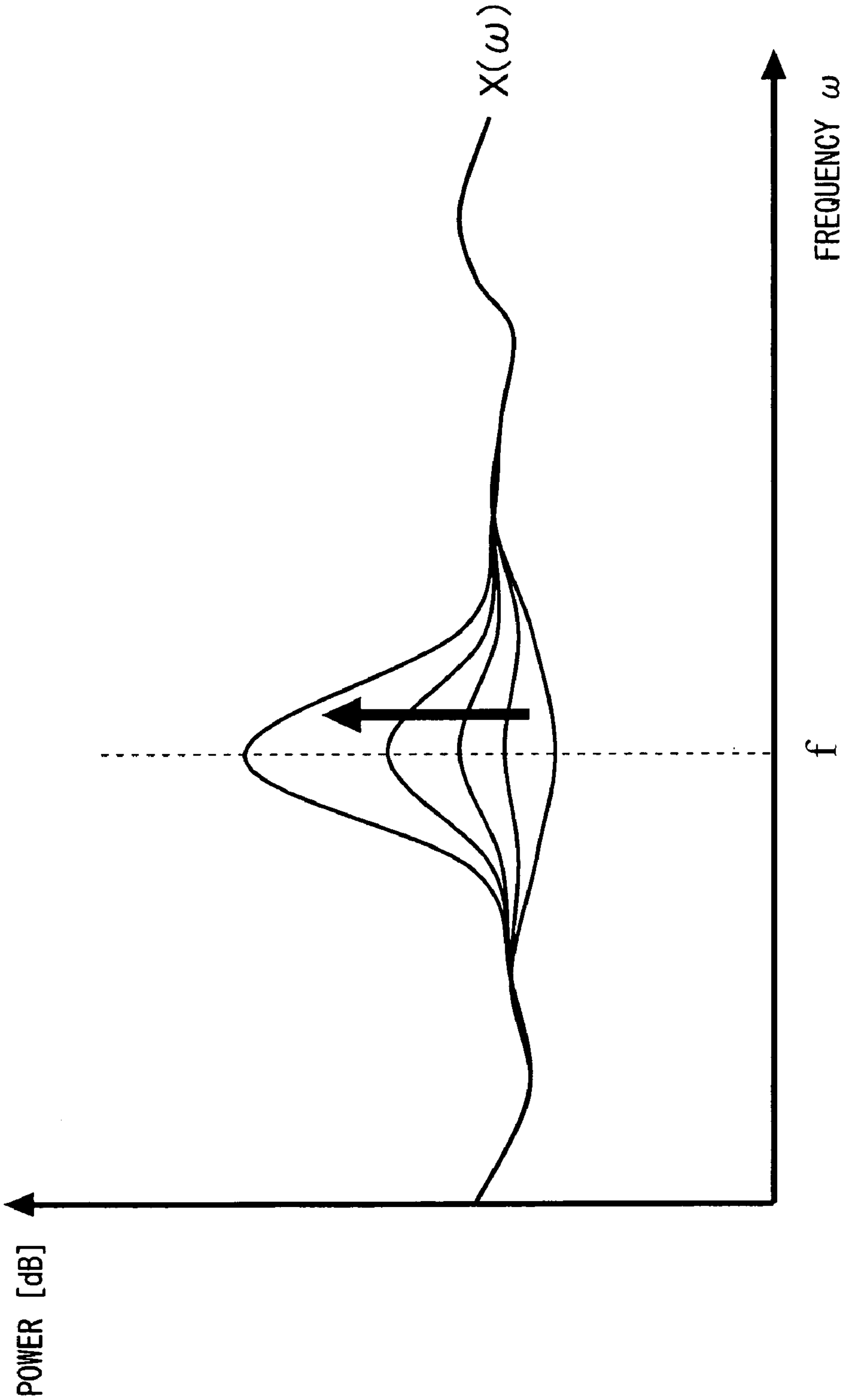
FIG. 13 is a view illustrating a change in a power spectrum X(ω) of sound signal outputted from a sound mixing section 93 at a time of a howling occurrence.
Figure 14:
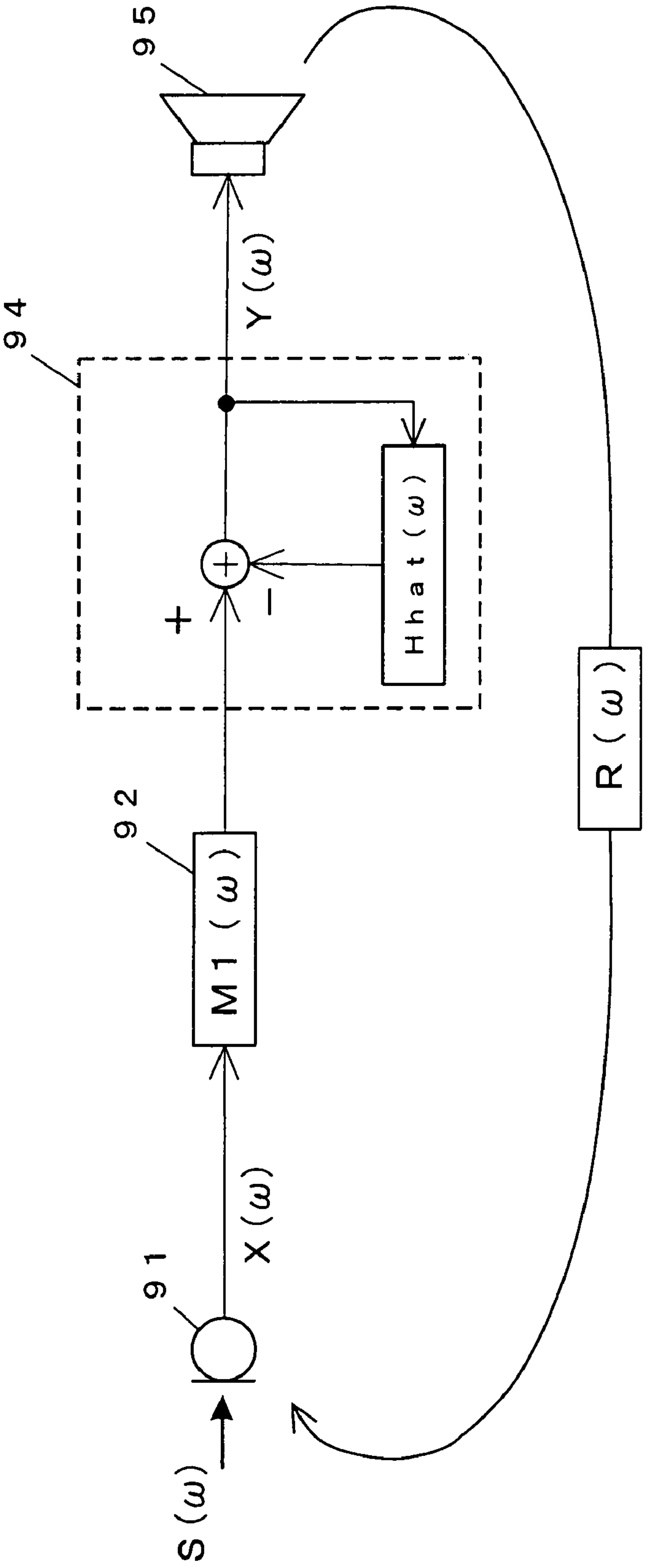
FIG. 14 is a schematic view illustrating characteristics of respective elements, included in the sound-intensifying system 9 to which one signal is inputted, which are pertinent to a transfer characteristic.

With reference to FIG. 3, a signal component in a word ending portion will be described. FIG. 3 are diagrams illustrating waveforms of the noise reference signal Y(t) and the sound signal Xm(t). As shown in FIG. 3, the sound section of the sound signal Xm(t) is longer than that of the noise reference signal Y(t) because the sound signal Xm(t) is delayed from the noise reference signal Y(t). This is because, as shown in FIG. 13 and formula 1, a sound signal collected and generated by a microphone includes, in addition to the sound S(ω) produced by a speaking person, a sound Y(ω)*R(ω), which is outputted by the speaker, propagated through space and then mixed again into the microphone. That is, the sound Y(ω)*R(ω) to be mixed is delayed from a sound outputted by the speaker 18 by a time period in which the sound Y(ω)*R(ω) is propagated through space. The same is also true of the sound signals inputted from the first microphone 11*a* and the second microphone 11*b*. As described above, the sound signal Xm(t) includes a signal component of the delayed sound Y(ω)*R(ω) which is propagated through space and then mixed again into the first microphone 11*a* and/or the second microphone 11*b*. That is, the word ending portion shown in FIG. 3 includes only the signal component propagated though space and then mixed again into the first microphone 11*a* and/or the second microphone 11*b*. The word ending detecting section 15 detects the aforementioned word ending portion, whereby the dominance ratio calculating section 16 described below can calculate a dominance ratio based on the signal component propagated through space and then mixed again into the first microphone 11*a* and/or the second microphone 11*b*. As a specific detection method performed by the word ending detecting section 15, power envelopes of the waveforms of the sound signal X(t) and the noise reference signal Y(t) are used, for example. The power envelopes (except for rising potions thereof) of the sound signal X(t) and the noise reference signal Y(t) are used so as to always monitor a ratio of the power envelope of the sound signal X(t) to that of the noise reference signal Y(t), thereby making it possible to detect the word ending portion. Alternately, the word ending detecting section 15 compares, in a same time domain, the noise reference signal Y(t) with the sound signal Xm(t), for example. Thereafter, the word ending detecting section 15 may detect a falling edge of each of the power envelopes, and a difference therebetween may be determined as the word ending portion. Information regarding the word ending (the delayed portion) detected by the word ending detecting section 15 is transmitted to the dominance ratio calculating section 16 and the howling suppressing section 17.

Based on the level of each of the sound signals outputted from the level detecting section 14 and the word ending detected by the word ending detecting section 15, the dominance ratio calculating section 16 calculates the dominance ratio of each of the plurality of sound signals having been inputted (Xm1(*t*) and Xm2(*t*) in FIG. 1). Note that the dominance ratio calculating section 16 performs a calculation process only in a word ending section detected by the word ending detecting section 15. Hereinafter, a calculation method of the dominance ratio will be described in detail. Note that the dominance ratio indicates a risk of a howling occurrence for each of the plurality of sound signals.

Among the levels calculated by the level detecting section 14, the level of a power spectrum included in the word ending section is denoted by a loop gain G. Also, a loop gain of the sound signal Xm1(*t*) is denoted by G1(ω), and a loop gain of the sound signal Xm2(*t*) is denoted by G2(ω). Similarly, a sound signal inputted from the nth (n is a natural number) microphone, the sound signal in which the frequency and gain characteristic thereof is adjusted by the sound characteristic adjusting section 12 is denoted by Xmn(t). In this case, a loop gain Gn(ω) of the sound signal Xmn(t) is represented by formula 7.

[Formula 7]

$$G_n(\omega)=M_n(\omega)*X_n(\omega) \quad (7)$$

Figure 4:
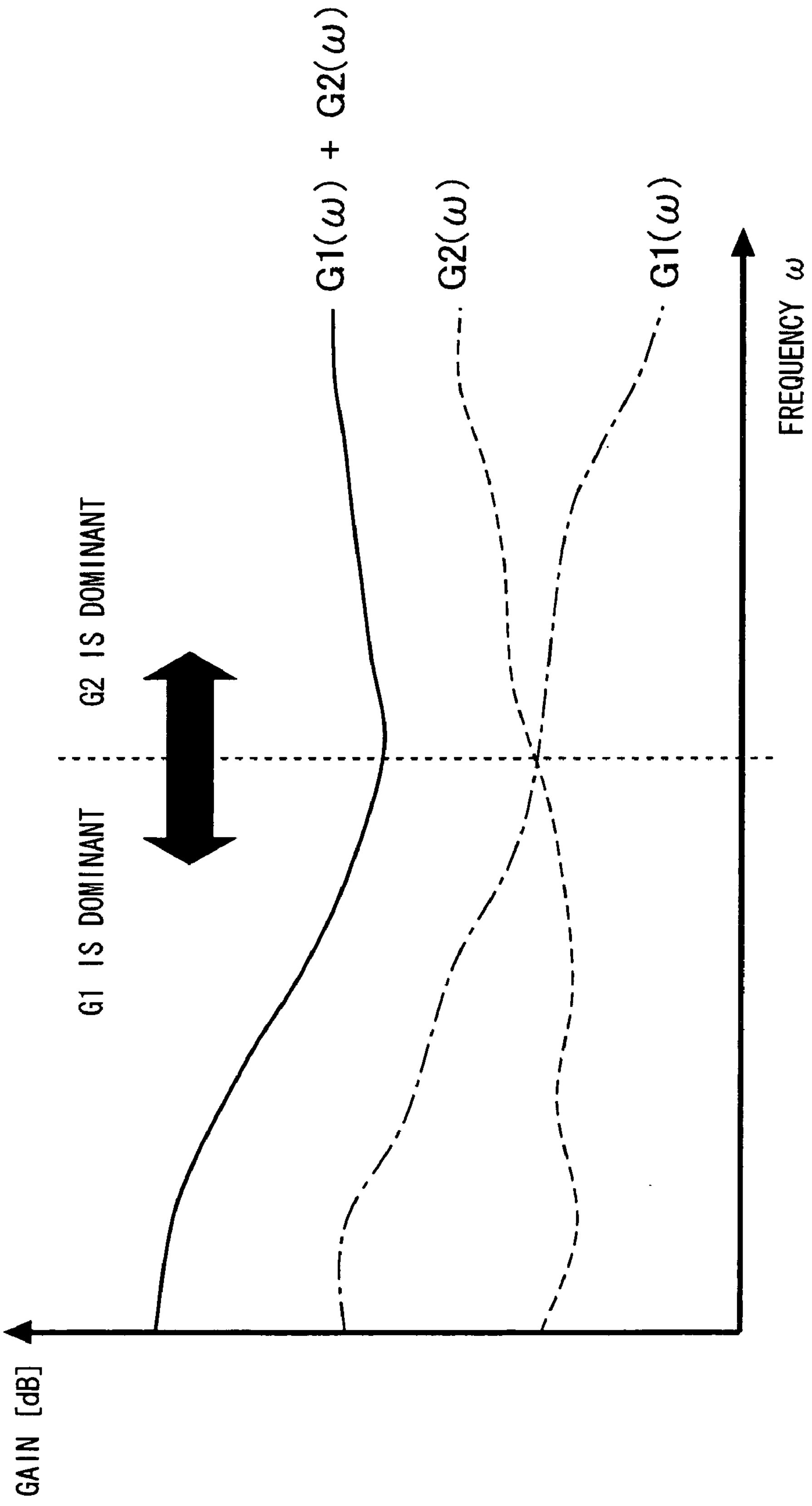
FIG. 4 is a diagram illustrating an example of spectrums of a loop gain G1(ω), G2(ω) and a sum of the loop gains (G1(ω)+G2(ω)).

Thereafter, the dominance ratio calculating section 16 extracts the loop gain G indicating the level of the word ending section from each of the levels of the sound signals, and calculates, as a dominance ratio of each of the sound signals, for example, a ratio of the loop gain of each of the sound signals to a sum of the loop gains of all sound signals. For example, in FIG. 1, the sum of the loop gains is G1(ω)+G2(ω). Therefore, a dominance ratio of the sound signal Xm1(*t*) is represented by a ratio of G1(ω) to the sum (G1(ω)+G2(ω)). Also, a dominance ratio of the sound signal Xm2(*t*) is represented by a ratio of G2(ω) to the sum (G1(ω)+G2(ω)) As described above, as shown in FIG. 4, based on a dominance ratio of each of the loop gains for each frequency band, the dominance ratio calculating section 16 can determine, in the word ending section, any of the loop gains of the sound signals which has a higher dominance ratio for the each frequency band. FIG. 4 is a diagram illustrating an example of spectrums of the loop gains G1(ω), G2(ω) and the sum of the loop gains (G1(ω)+G2(ω)). In the example of FIG. 4, the dominance ratio of G2(ω) is higher in a frequency band larger than the frequency f. Thus, it is determined that G2(ω) is dominant. On the other hand, the dominance ratio of G1(ω) in a frequency band smaller than the frequency f is higher. Thus, it is determined that G1(ω) is dominant.

Figure 15:
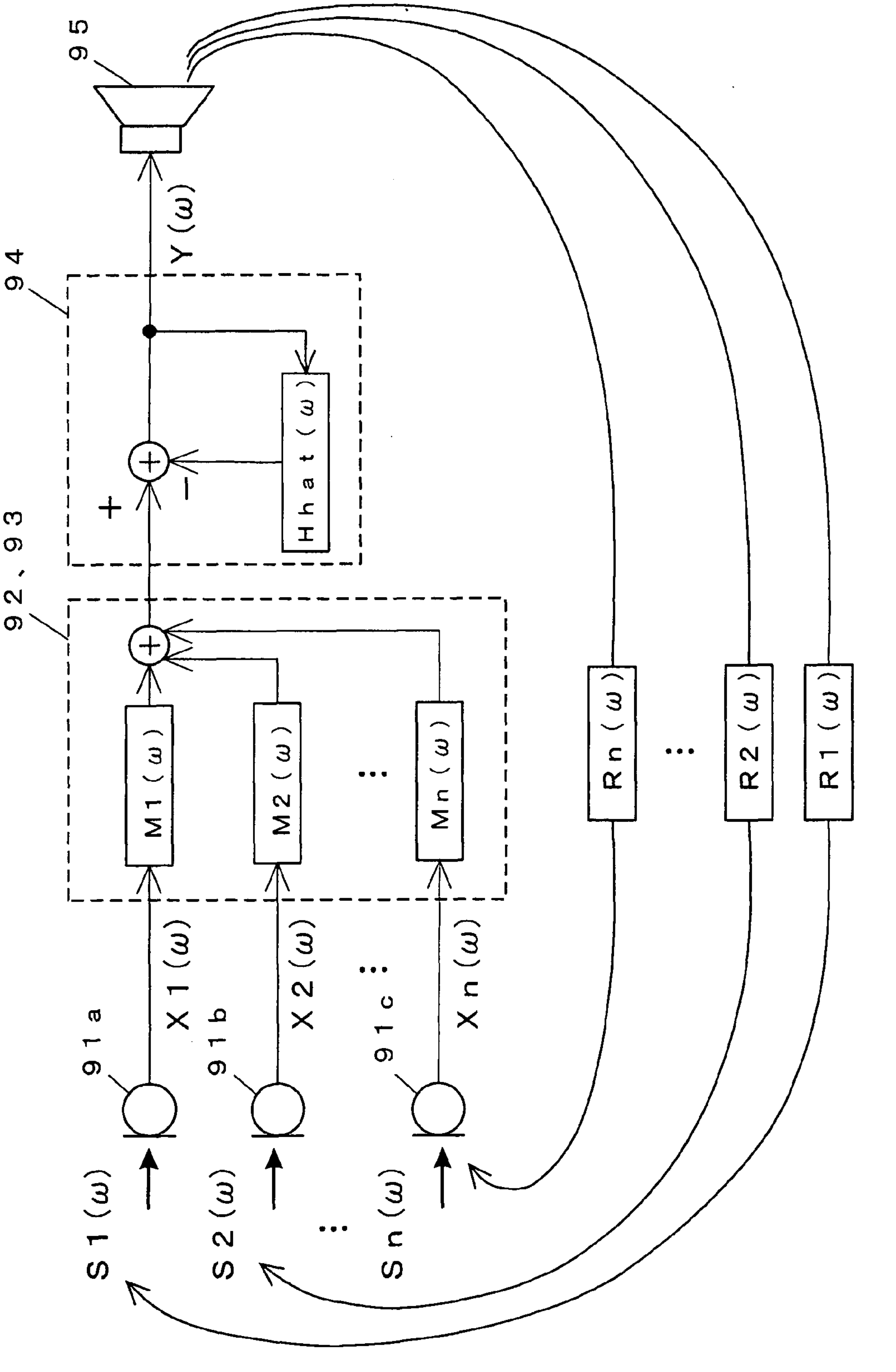
FIG. 15 is a schematic view illustrating characteristics of respective elements, included in the sound-intensifying system 9 to which the plurality of sound signals are inputted, which are pertinent to the transfer characteristics.

As described above, in the word ending section including only the signal component propagated through space, the dominance ratio calculating section 16 calculates a dominance ratio of each of the sound signals, thereby detecting any of the sound signals which has a higher dominance ratio. Note that the signal component propagated through space is a signal component which causes a howling occurrence. Therefore, the dominance ratio calculating section 16 can detect, before howling occurs, whether a sound transmitted through R1(ω) shown in FIG. 15 is dominant or whether a sound transmitted through R2(ω) shown in FIG. 15 is dominant. The more dominant a sound signal is, the higher a risk of a howling occurrence is. Note that the sound characteristic adjusting section 12, the sound mixing section 13, the level detecting section 14, the word ending detecting section 15, and the dominance ratio calculating section 16 correspond to the howling detection device according to the present invention. The howling detection device according to the present invention calculates the dominant ratio, thereby making it possible to detect the risk of the howling occurrence for each of the plurality of sound signals.

If the howling detection device is structured such that a calculated dominance ratio is learned and updated by a predetermined method each time the word ending is detected, a dominance ratio can be sequentially changed in accordance with a positional change of a microphone. Note that a time at which the dominance ratio is learned is not limited to a time at which the word ending is detected. The time at which the dominance ratio is learned may be adjusted as necessary, taking account of an estimated sequence and accuracy.

Figure 5:
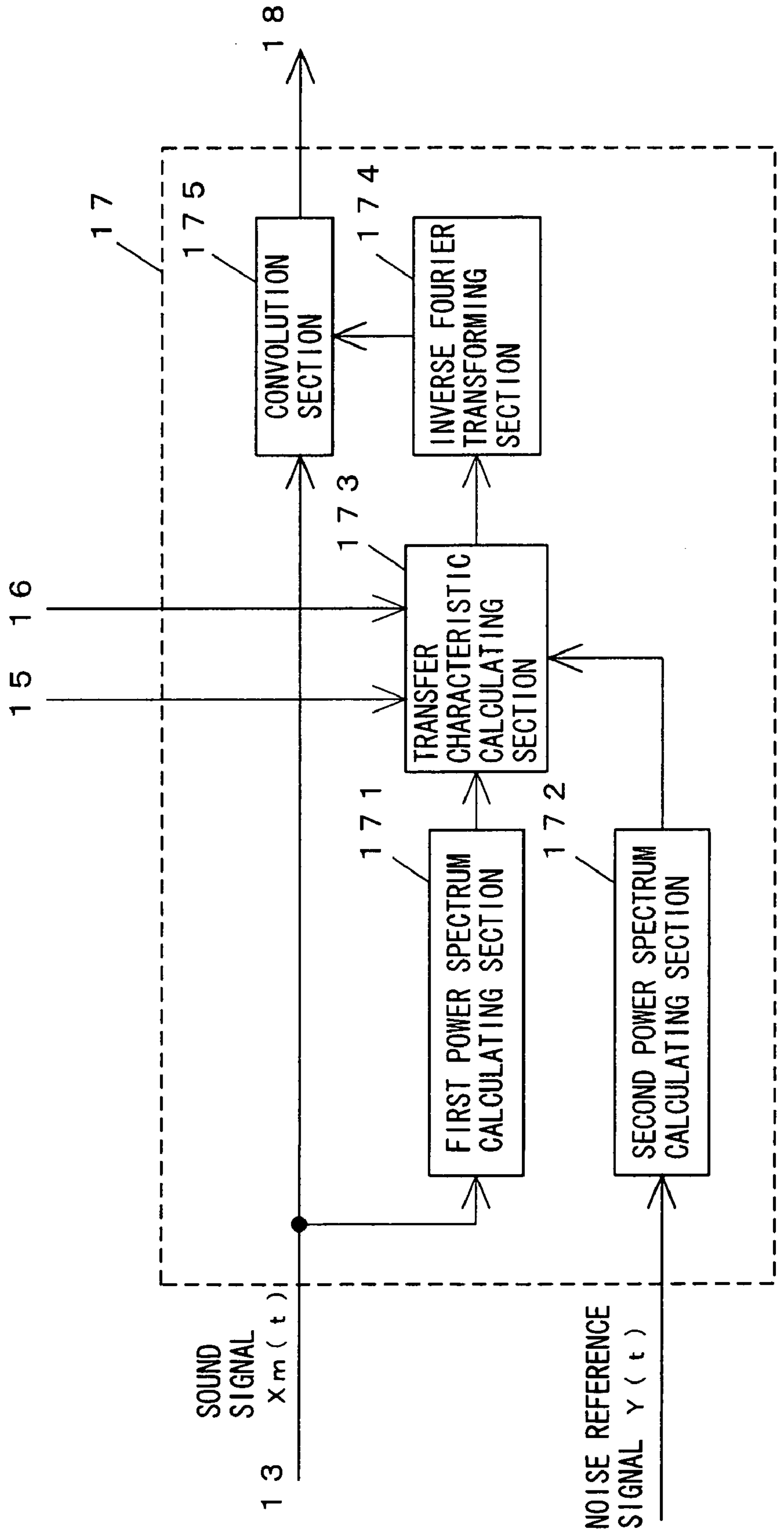
FIG. 5 is a block diagram illustrating an exemplary configuration of a howling suppressing section 17.

The howling suppressing section 17 performs a signal processing on the sound signal Xm(t) mixed by the sound mixing section 13 so as to suppress howling. The sound signal on which the signal processing has been performed is amplified as necessary so as to be outputted by the speaker 18. Hereinafter, with reference to FIG. 5, a processing method performed by the howling suppressing section 17 will be described in detail. FIG. 5 is a block diagram illustrating an exemplary configuration of the howling suppressing section 17. As shown in FIG. 5, a two-input subtraction configuration is adapted. In the two-input subtraction configuration, a sound signal to be intensified is used as the noise reference signal, thereby making it possible to suppress the howling occurrence while learning the transfer characteristic in accordance with the word ending included in the sound signal to be intensified. In FIG. 5, the howling suppressing section 17 includes a first power spectrum calculating section 171, a second power spectrum calculating section 172, a transfer characteristic calculating section 173, an inverse fourier transforming section 174, and a convolution section 175.

In FIG. 5, the sound signal Xm(t) outputted from the sound mixing section 13 is inputted to the first power spectrum calculating section 171. Then, the first power spectrum calculating section 171 calculates a power spectrum X(ω) of the sound signal Xm(t). The noise reference signal Y(t) is inputted to the second power spectrum calculating section 172. Then, the second power spectrum calculating section 172 calculates a power spectrum Y(ω) of the noise reference signal Y(t). Note that the sound signal to be intensified, as the noise reference signal Y(t), is a sound signal obtained immediately before being outputted by the speaker 18, for example. Alternatively, the sound signal to be intensified may be a sound signal in which a sound outputted in a close proximity of the speaker 18 is collected and generated by another microphone or the like.

Based on the sound signal Xm(ω) and the noise reference signal Y(ω), the transfer characteristic calculating section 173 firstly estimates a power spectrum ratio Hr(ω) only in the word ending section detected by the word ending detecting section 15. The power spectrum ratio Hr(ω) is represented by formula (8).

[Formula 8]

$$Hr(\omega) = \varepsilon\left\{\frac{X(\omega)}{Y(\omega)}\right\} \quad (8)$$

Note that ε indicates an average. Thereafter, the transfer characteristic calculating section 173 calculates a transfer characteristic Hsup(ω) shown in formula (9) based on the power spectrum ratio Hr(ω) estimated by formula (8).

[Formula 9]

$$H_{sup}(\omega) = \frac{X(\omega) - Hr(\omega) * Y(\omega)}{X(\omega)} \quad (9)$$

As described above, in the present invention, Hsup(ω) is a function used for estimating the sound signal Xm(t) excluding a signal having the same signal component as a signal included in the word ending section.

Next, the transfer characteristic calculating section 173 multiplies Hsup(ω) calculated by formula (9) by a change rate of the sum of the loop gains, the change rate obtained based on the loop gain and dominance ratio, of each of the sound signals, calculated by the dominance ratio calculating section 16, thereby calculating Hsup(ω). Hereinafter, a calculation method of Hsup(ω) will be described.

It is assumed that a user performs a mixing operation in the sound characteristic adjusting section 12 and the sound mixing section 13, and changes the frequency and gain characteristic of each of the sound signals X1(*t*) and X2(*t*). In accordance with the operation, the frequency and gain characteristic M1(ω) of the sound signal Xm1(*t*) and the frequency and gain characteristic M2(ω) of the sound signal Xm2(*t*) change. In this case, as shown in formula 7, the loop gains G1(ω) and G2(ω) accordingly change. Here, between the dominance ratios calculated, before the mixing operation, by the dominance ratio calculating section 16, it is assumed that the dominance ratio of the loop gain G1(ω) is higher than that of the loop gain G2(ω). Also, the loop gain G1(ω) calculated, after the mixing operation, by the dominance ratio calculating section 16 is denoted by a loop gain G1*new*(ω), and the loop gain G1(ω) calculated, before the mixing operation, by the dominance ratio calculating section 16 is denoted by a loop gain G1*old*(ω). Similarly, the loop gain G2(ω) calculated, after the mixing operation, by the dominance ratio calculating section 16 is denoted by a loop gain G2*new*(ω), and the loop gain G2(ω) calculated, before the mixing operation, by the dominance ratio calculating section 16 is denoted by a loop gain G2*old*(ω).

In this case, the sum of the loop gains calculated, before the mixing operation, by the dominance ratio calculating section 16 is represented by G1*old*(ω)+G2*old*(ω). In contrast, the sum of the loop gains calculated, after the mixing operation, by the dominance ratio calculating section 16 is a sum obtained by taking account of only the loop gain having the highest dominance ratio among the dominance ratios calculated before the mixing operation. Specifically, in the above example, the dominance ratio of the loop gain G1(ω) is higher than that of the loop gain G2(ω). Thus, the sum of the loop gains calculated, after the mixing operation, by the dominance ratio calculating section 16 is represented by G1*new*(ω)+G2*old*(ω). In this case, the change rate Lr(ω) of the sum of the loop gains is represented by formula 10.

[Formula 10]

$$Lr(\omega) = \frac{G_{1new}(\omega) + G_{2old}(\omega)}{G_{1old}(\omega) + G_{2old}(\omega)} \quad (10)$$

As described above, based on the loop gain and dominance ratio, of each of the sound signals, calculated by the dominance ratio calculating section 16, the change rate Lr(ω) of the sum of the loop gains is obtained. That is, in the change rate Lr(ω) of the sum of the loop gains, it is estimated that the sum of the loop gains (G1(ω)old+G2(ω)old) is changed to the sum of the loop gains (G1(ω)new+G2(ω)old) in accordance with a change in the loop gain G1(ω) having the highest dominance ratio. Note that in the above description, the sum of the loop gains is reflected only by the loop gain having the highest dominance ratio. This is on the grounds that it is rare that gains of two or more sound signals are simultaneously changed when the user performs the mixing operation, thereby making it possible to perform a robust howling suppression even if the change rate Lr(ω) is changed only in accordance with the loop gain having the highest dominance ratio. As described above, the sum of the loop gains is reflected by the loop gain having the highest dominance ratio, thereby making it possible to perform an effective and robust howling suppression, while taking account of only the sound signal having a high risk of a howling occurrence even if the plurality of sound signals are inputted.

The transfer characteristic calculating section 173 multiplies the change rate, shown in formula (10), of the sum of the loop gains, by the transfer characteristic Hsup(ω) calculated by formula (9), thereby calculating a transfer characteristic Hsup_new(ω) corresponding to the change rate of the sum of the loop gains. Note that the transfer characteristic Hsup(ω) is denoted by Hsup_old(ω), and the transfer characteristic corresponding to the change rate of the sum of the loop gains is denoted by Hsup_new(ω). In this case, the transfer characteristic Hsup_new(ω) corresponding to the change rate of the sum of the loop gains is represented by formula (11).

[Formula 11]

$$H_{sup\_new}(\omega) = Lr(\omega) * H_{sup\_old}(\omega) \quad (11)$$

As described above, in the present invention, the transfer characteristic Hsup_new(ω) corresponding to the change rate of the sum of the loop gains is a transfer characteristic obtained by multiplying Hsup(ω)_old, which is an estimated function, by the change rate of the sum of the loop gains.

Hsup_new(ω) updated by formula (11) is converted into a time domain by the inverse fourier transforming section 174. Hsup_new(ω) having been converted into the time domain is denoted by a filter coefficient Hsup_new(t). The convolution section 175 convolutes the filter coefficient Hsup_new(t) with the sound signal Xm(t) inputted from the sound mixing section 13, thereby subtracting from the sound signal Xm(t) the signal having only the same signal component as the signal included in the word ending section detected by the word ending detecting section 15. Note that Hsup(ω) is calculated (formula (9)) and updated (formula (11)) when the word ending is detected by the word ending detecting section 15. Alternatively, Hsup(ω) calculated (formula (9)) and updated (formula (11)) may be learned by a predetermined method each time the word ending is detected, for example.

As described above, according to the present embodiment, the dominance ratio calculating section 16 calculates the loop gain and dominance ratio of each of the sound signals, thereby calculating the transfer characteristic by using the change rate, of the sum of the loop gains, which is obtained based on the dominance ratio. Furthermore, because the dominance ratio is calculated based on an output signal outputted from the sound characteristic adjusting section 12, the dominance ratio is a value changed in accordance with the frequency characteristic and gain characteristic adjusted by the sound characteristic adjusting section 12. Thus, in the sound-intensifying system for mixing and intensifying the plurality of sound signals, the transfer characteristic, which is used for a howling suppression, is calculated based on the dominance ratio, there by making it possible to perform a robust howling suppression, even when the transfer characteristic is rapidly changed by the sound characteristic adjusting section 12. That is, the robust howling suppression can be realized even when the user performs the mixing operation and M(ω) is rapidly changed in accordance with the operation.

In the aforementioned description, the sum of the loop gains is estimated based on the loop gain, changed in accordance with time, which has the highest dominance ratio among the dominance ratios calculated, before the mixing operation, by the dominance ratio calculating section 16. However, the present invention is not limited thereto. For example, the sum of the loop gains may be reflected by a plurality of loop gains having relatively high dominance ratios. For example, it is assumed that three microphones are provided, and loop gains of the microphones are denoted by G1(ω), G2(ω) and G3(ω), respectively. In addition, it is also assumed that a dominance ratio of the loop gain G1(ω) and a dominance ratio of the loop gain G2(ω) are higher than that of the loop gain G3(ω) before the mixing operation. A sum of the loop gains (G1(ω)+G2(ω)+G3(ω)) may be reflected by the loop gains G1(ω) and G2(ω). In this case, the change rate Lr(ω) of the sum of the loop gains is represented by formula 12.

[Formula 12]

$$Lr(\omega) = \frac{G_{1new}(\omega) + G_{2new}(\omega) + G_{3old}(\omega)}{G_{1old}(\omega) + G_{2old}(\omega) + G_{3old}(\omega)} \tag{12}$$

Furthermore, the transfer characteristic calculating section 173 may use the dominance ratios calculated by the dominance ratio calculating section 16 so as to reflect the loop gains of the sound signals, respectively, thereby obtaining the change rate of the sum of the loop gains. Alternatively, the transfer characteristic calculating section 173 may calculate the transfer characteristic, used for howling suppression, based on the dominance ratios by a method other than that using the change rate of the sum of the loop gains.

In the above description, two sound signals are inputted to the sound-intensifying system 1. However, the present invention is not limited thereto. For example, the sound-intensifying system 1 may have three or more microphones and three or more sound signals may be inputted to the sound-intensifying system 1. Furthermore, in the above description, a detailed subtraction configuration of the howling suppressing section 17 is shown in FIG. 5. However, the present invention is not limited thereto. Various subtraction methods other than a method using a filter for performing convolution are well-known, and the howling suppressing section 17 may be configured so as to use the subtraction methods.

In the above description, the level detecting section 14 may analyze a frequency of each of the sound signals, thereby calculating the level of each of the sound signals using the power spectrum. However, the present invention is not limited thereto. For example, the level detecting section 14 may calculate power of each of the sound signals at a predetermined time interval based on a scalar value. In this case, the dominance ratio calculating section 16 calculates the dominance ratio of each of the sound signals based on the scalar value. Also, the change rate Lr(ω) of the sum of the loop gains is represented based on the scalar value.

Second Embodiment

Figure 6:
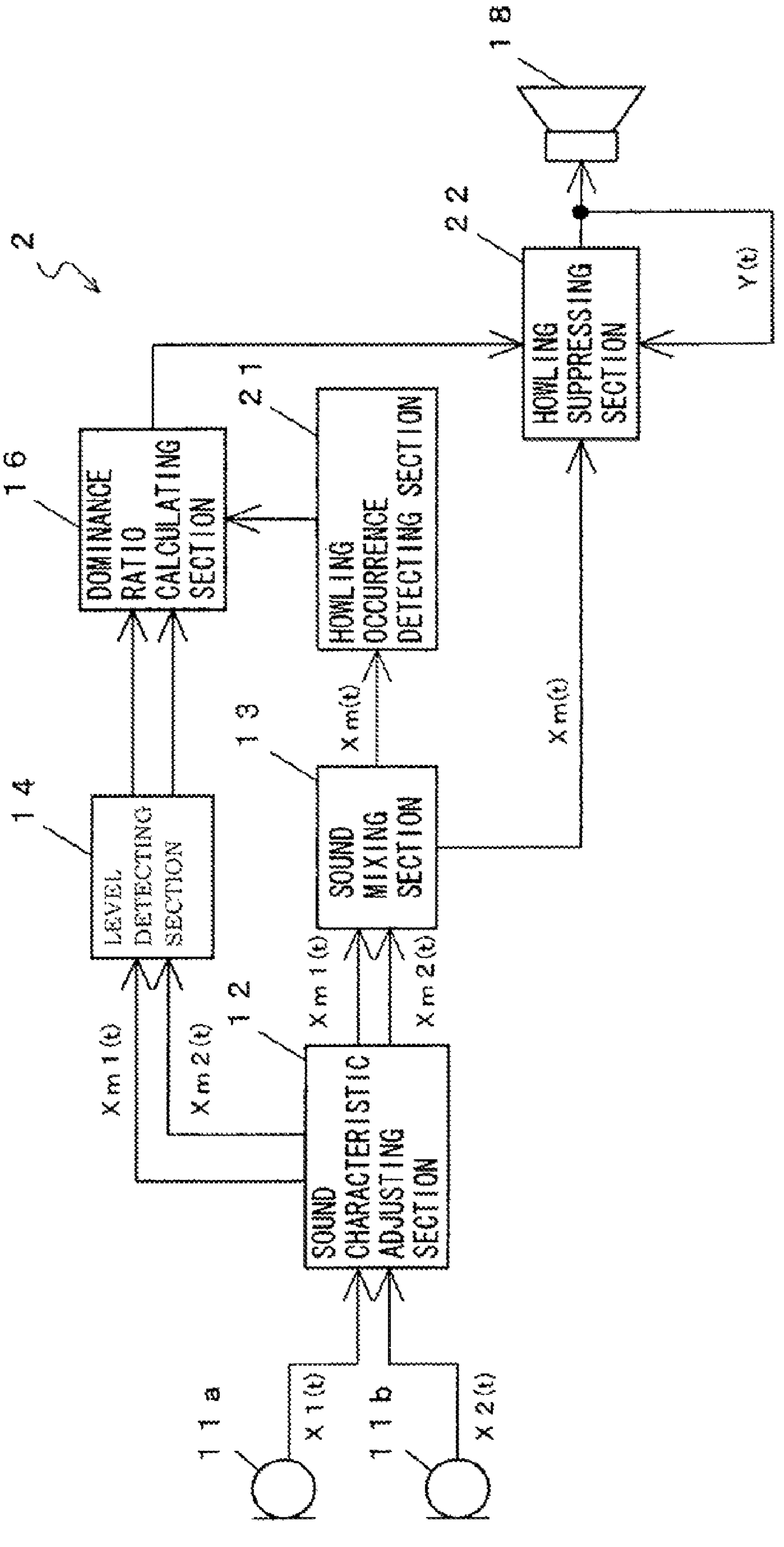
FIG. 6 is a block diagram illustrating an exemplary configuration of a sound-intensifying system 2.

With reference to FIG. 6, a sound-intensifying system 2, in which a howling detection method and howling suppression method according to a second embodiment of the present invention are adapted, will be described. FIG. 6 is a block diagram illustrating an exemplary configuration of the sound-intensifying system 2. In FIG. 6, the sound-intensifying system 2 includes the first microphone 11*a*, the second microphone 11*b*, the sound characteristic adjusting section 12, the sound mixing section 13, the level detecting section 14, a howling occurrence detecting section 21, the dominance ratio calculating section 16, a howling suppressing section 22, and the speaker 18. In the first embodiment, the dominance ratio of each of the sound signals is calculated only in the word ending section. However, in the present embodiment, the dominance ratio of each of the sound signals is calculated when howling is detected. Therefore, there is a difference between the first embodiment and the present embodiment. Hereinafter, the present embodiment will be described mainly with respect to this difference. Similarly to the first embodiment, the sound-intensifying system 2 may be a system for intensifying a sound by means of three or more microphones. However, in the present embodiment, it is assumed that the sound-intensifying system 2 intensifies the sound by means of two microphones.

In FIG. 6, the first microphone 11*a* collects a sound to be outputted by the speaker 18, and generates a sound signal. The sound signal generated by the first microphone 11*a* is denoted by X1(*t*). Similarly, the second microphone 11*b* collects a sound to be intensified, and generates a sound signal X2(*t*). The sound signals X1(*t*) and X2(*t*) are inputted to the sound characteristic adjusting section 12. The sound characteristic adjusting section 12 adjusts a frequency and gain characteristic of each of the sound signals. Thereafter, sound signals Xm1(*t*) and Xm2(*t*) adjusted by the sound characteristic adjusting section 12 are mixed by the sound mixing section 13. The level detecting section 14 detects a level of each of the sound signals Xm1(*t*) and Xm1(*t*) outputted from the sound characteristic adjusting section 12. Thereafter, all information regarding the level, for each frequency band, detected by the level detecting section 14 at a predetermined time interval is outputted to the dominance ratio calculating section 16. The process described above is similar to that in the aforementioned first embodiment.

The howling occurrence detecting section 21 calculates a power spectrum Xm(ω) of the sound signal Xm(t) mixed by the sound mixing section 13, thereby detecting a howling occurrence. For example, it is assumed that howling occurs at a specific frequency f. In this case, the power spectrum X(ω) of the sound signal Xm(t) changes, as shown in FIG. 13, such that power of the power spectrum rapidly increases at the specific frequency f. Therefore, a power difference between a frequency band and its adjacent frequency band is always monitored, thereby detecting that power in a frequency band including the specific frequency f is rapidly increased. That is, the power spectrum X(ω) of the sound signal Xm(t) is monitored, thereby detecting an initial occurrence of howling (a state in which howling is almost likely to occur). Thereafter, information, regarding the initial occurrence of howling, which is detected by the howling occurrence detecting section 21, is outputted to the dominance ratio calculating section 16.

Based on the level of each of the sound signals outputted from the level detecting section 14 and the information detected by the howling occurrence detecting section 21, the dominance ratio calculating section 16 calculates a dominance ratio of each of the plurality of sound signals having been inputted (Xm1(*t*) and Xm2(*t*) in FIG. 6). Note that the dominance ratio calculating section 16 performs a calculation process so as to calculate a dominance ratio at a time of the initial occurrence of howling detected by the howling occurrence detecting section 21. Among the levels calculated by the level detecting section 14, the level of a power spectrum obtained when the initial occurrence of howling is detected is denoted by a loop gain G. A detailed method for calculating the dominance ratio is the same as that described in the first embodiment. Thus, the description thereof will be omitted. Furthermore, in the present embodiment, the dominance ratio calculating section 16 calculates the dominance ratio of each of the sound signals, thereby making it possible to detect any of the sound signals which is dominant at the time of the initial occurrence of howling. Similarly to the aforementioned first embodiment, the dominance ratio in the present embodiment indicates the risk of the howling occurrence for each of the plurality of sound signals. As described above, the sound characteristic adjusting section 12, the sound mixing section 13, the level detecting section 14, the howling occurrence detecting section 21, and the dominance ratio calculating section 16 correspond to the howling detection device according to the present invention. That is, the howling detection device according to the present invention calculates the dominance ratio, thereby making it possible to detect the risk of the howling occurrence for each of the plurality of sound signals.

Figure 7:
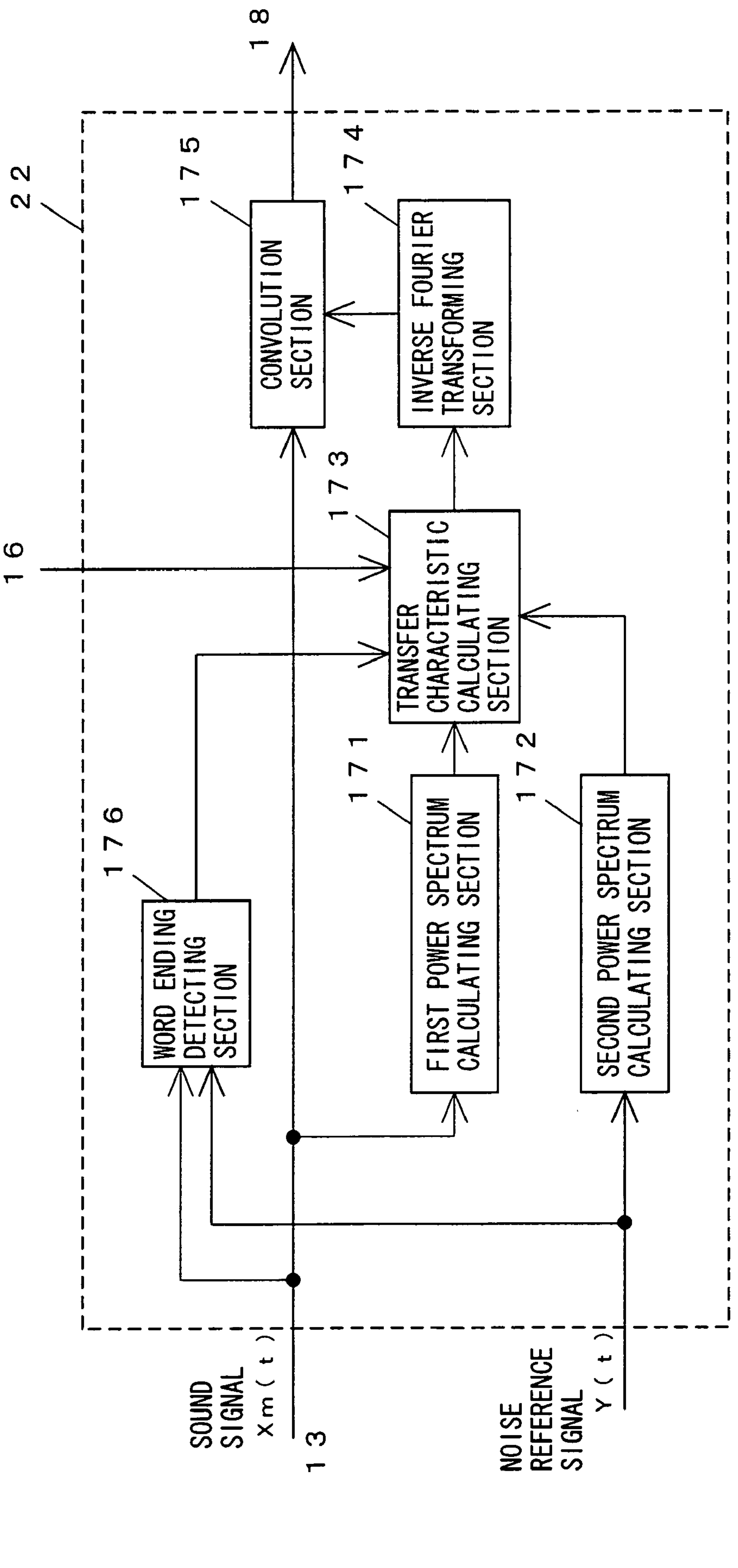
FIG. 7 is a block diagram illustrating an exemplary configuration of a howling suppressing section 22 according to a second embodiment.

The howling suppressing section 22 performs a signal processing on the sound signal Xm(t) mixed by the sound mixing section 13 so as to suppress howling. Thereafter, the sound signal on which the signal processing has been performed is amplified as necessary so as to be outputted by the speaker 18. Hereinafter, with reference to FIG. 7, a processing method performed by the howling suppressing section 22 will be described. FIG. 7 is a block diagram illustrating an exemplary configuration of the howling suppressing section 22 according to the second embodiment. In FIG. 7, the howling suppressing section 22 includes the first power spectrum calculating section 171, the second power spectrum calculating section 172, the transfer characteristic calculating section 173, the inverse fourier transforming section 174, the convolution section 175, and a word ending detecting section 176. Note that in the howling suppressing section 17 described above, information regarding the word ending is referred to by the word ending detecting section 15. However, the howling suppressing section 22 is different from the howling suppression section 17 in that the howling suppressing section 22 further includes the word ending detecting section 176, and the information regarding the word ending is referred to by the word ending detecting section 176. Hereinafter, the present embodiment will be described mainly with respect to this difference.

In FIG. 7, the sound signal Xm(t) outputted from the sound mixing section 13 is inputted to the first power spectrum calculating section 171. Then, the first power spectrum calculating section 171 calculates a power spectrum X(ω) of the sound signal Xm(t). A noise reference signal Y(t) is inputted to the second power spectrum calculating section 172. Then, the second power spectrum calculating section 172 calculates a power spectrum Y(ω) of the noise reference signal Y(t).

The word ending detecting section 176 has the same function as the word ending detecting section 15 described above. Based on the sound signal Xm(t) inputted from the sound mixing section 13 and the noise reference signal Y(t), the word ending detecting section 176 detects a delay section, as a word ending, which is a time difference between a sound section of the noise reference signal Y(t) and a sound section of the sound signal Xm(t). Similarity to the aforementioned first embodiment, the noise reference signal Y(t) is a sound signal obtained immediately before being outputted by the speaker 18, for example. In FIG. 7, the word ending detecting section 176 is formed in an interior of the howling suppressing section 22. However, the word ending detection section 176 may be provided external to the howling suppressing section 22. Alternatively, the howling suppressing section 22 and the word ending detecting section 176 may be formed in a separate manner, and information detected by the word ending detecting section 176 may be inputted to the howling suppressing sections 22.

Based on the sound signal Xm(ω) and the noise reference signal Y(ω), the transfer characteristic calculating section 173 firstly estimates a power spectrum ratio Hr(ω), shown in formula 8, only in the word ending section detected by the word ending detecting section 176. Thereafter, the transfer characteristic calculating section 173 calculates a transfer characteristic Hsup(ω) shown in formula (9) based on the power spectrum ratio Hr(ω) estimated in formula 8. Next, the transfer characteristic calculating section 173 multiplies Hsup(ω), calculated by formula (9), by a change rate of the sum of the loop gains, the change rate obtained based on the loop gain and dominance ratio, of each of the sound signals, calculated by the dominance ratio calculating section 16, thereby calculating a transfer characteristic Hsup(ω)_new corresponding to the change rate. Then, the transfer characteristic Hsup_new(ω), calculated by formula (II), corresponding to the change rate is converted into a time domain by the inverse fourier transforming section 174. The convolution section 175 convolutes a filter coefficient Hsup_new(t) having been converted into the time domain with the sound signal Xm(t) inputted from the sound mixing section 13, thereby subtracting from the sound signal Xm(t) a signal having only the same signal component as a signal included in the word ending section detected by the word ending detecting section 176. In this case, the transfer characteristic Hsup(ω)_new corresponding to the change rate is calculated based on a change rate, of a sum of the loop gains, which is obtained by any of the loop gains which causes the initial occurrence of howling. Therefore, it becomes possible to suppress howling while taking account of any sound signal which currently causes the initial occurrence of the howling and a frequency component of the sound signal.

In the present embodiment, Hsup(ω) is calculated (formula (9)) when the word ending detecting section 176 detects the word ending. Hsup(ω) corresponding to the change rate, of the sum of the loop gains, which is obtained based on the dominance ratio is updated (formula (11)) when the howling occurrence detecting section 21 detects the initial occurrence of howling. Alternatively, Hsup(ω) calculated by formula 9 may be learned by a predetermined method each time the word ending is detected, for example. Hsup(ω) calculated by formula 11 may be learned by a predetermined method each time the initial occurrence of howling is detected, for example.

As described above, according to the present embodiment, the dominance ratio calculating section 16 calculates the loop gain and dominance ratio of each of the sound signals at the time of the initial occurrence of howling. Thereafter, the transfer characteristic is calculated so as to correspond to the change rate, of the sum of the loop gains, which is obtained based on the dominance ratio. Furthermore, because the dominance ratio is calculated based on an output signal outputted from the sound characteristic adjusting section 12, the dominance ratio is a value changed in accordance with the frequency characteristic and gain characteristic adjusted by the sound characteristic adjusting section 12. Thus, in the a sound-intensifying system for mixing and intensifying the plurality of sound signals, the transfer characteristic, which is used for a howling suppression, is calculated based on the dominance ratio, there by making it possible to perform a robust howling suppression, even when howling occurs due to the sound characteristic adjusting section 12 which rapidly changes the transfer characteristic. Specifically, even when M(ω) is rapidly changed in accordance with the mixing operation performed by the user, and howling is almost likely to occur, a robust howling suppression can be realized. As a result, it becomes possible to prevent the howling from occurring.

Third Embodiment

Figure 8:
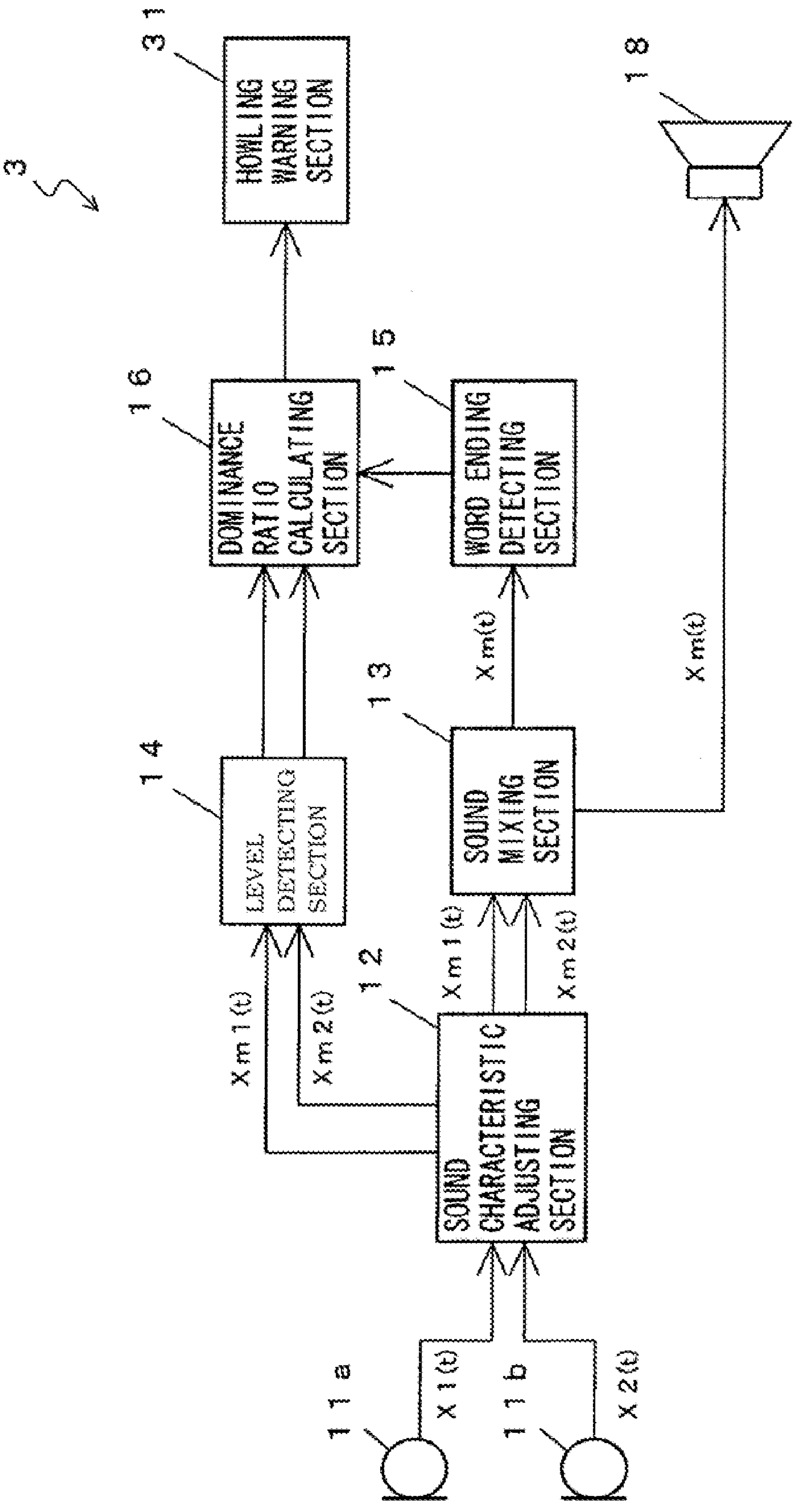
FIG. 8 is a block diagram illustrating an exemplary configuration of a howling warning device.
Figure 9:
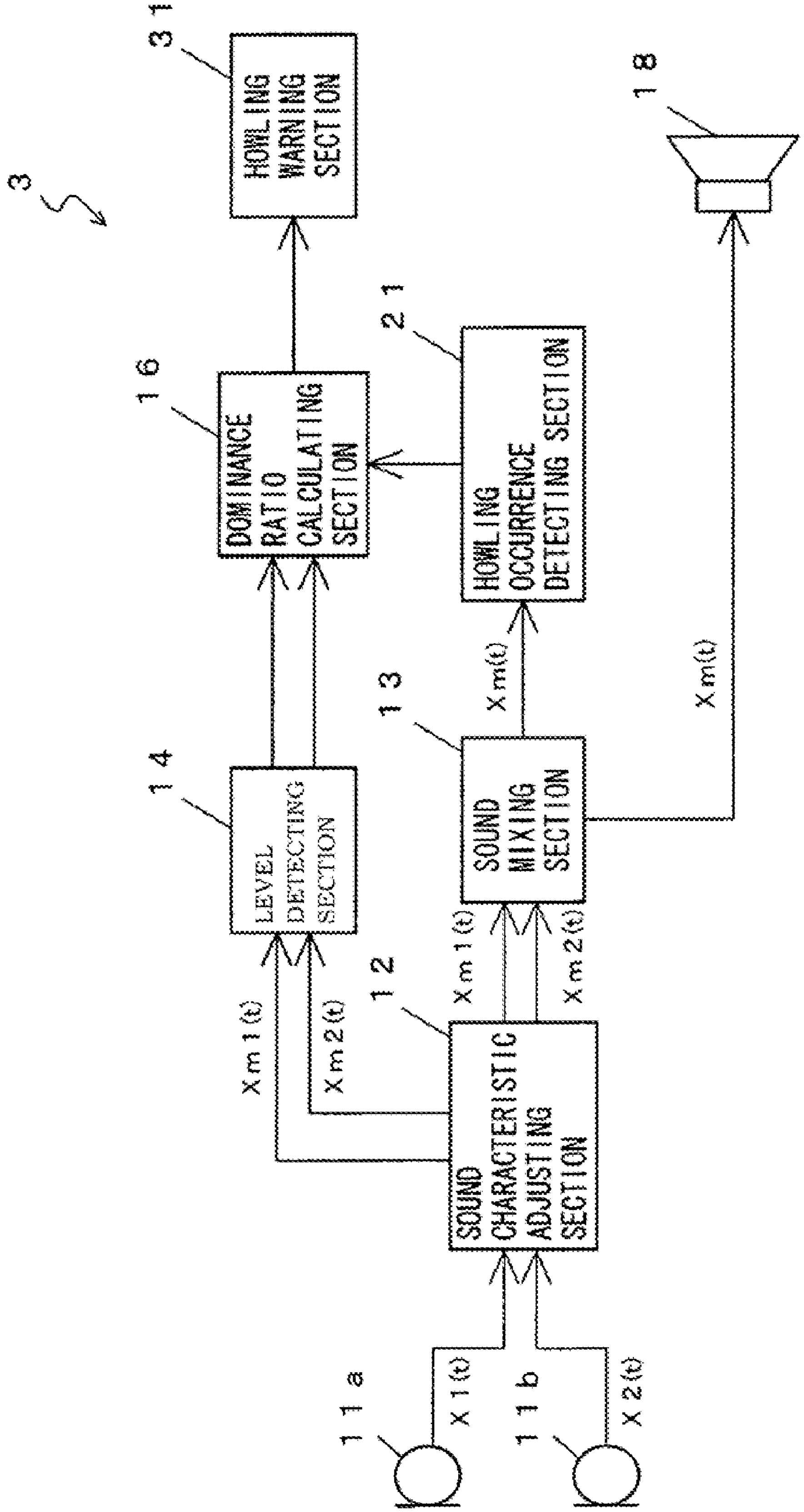
FIG. 9 is a block diagram illustrating an exemplary configuration of the howling warning device in which a howling occurrence detecting section 21 is used.
Figure 10:
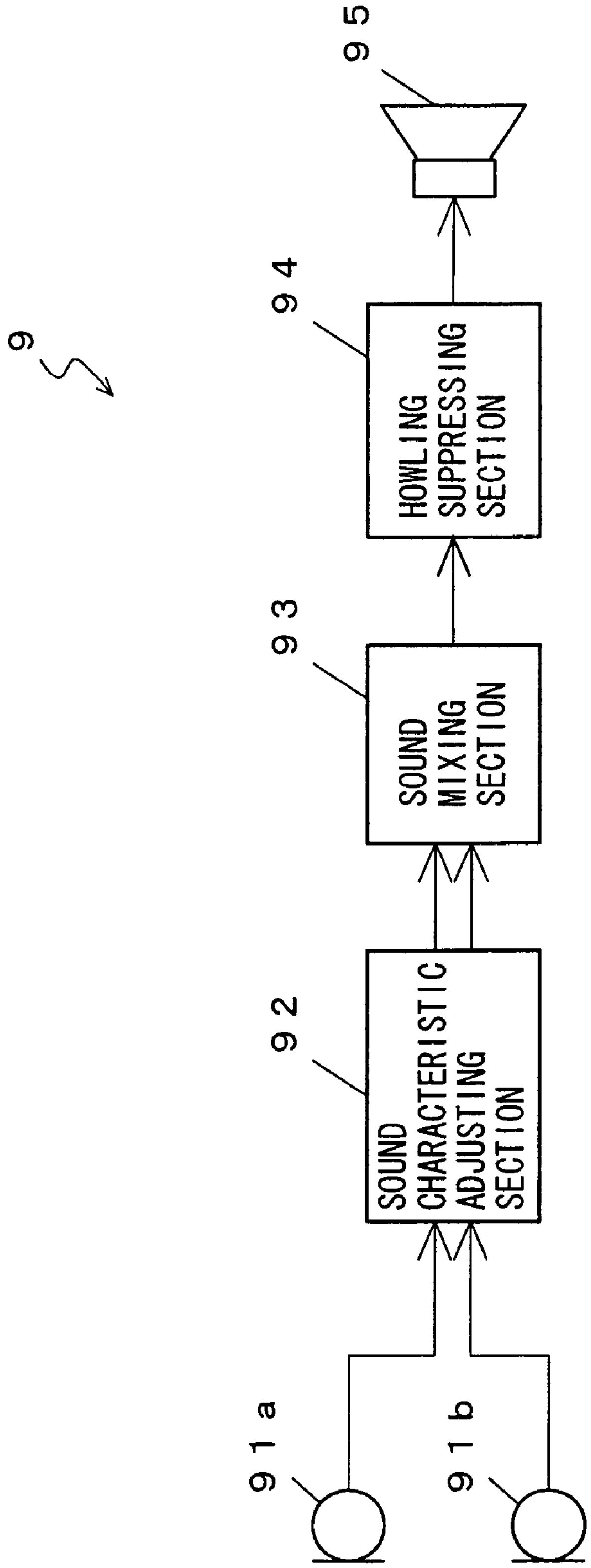
FIG. 10 is a view illustrating an exemplary configuration of a sound-intensifying system 9, for mixing and intensifying a plurality of sound signals, in which howling suppression devices disclosed in patent document 1 and patent document 2 are adapted.
Figure 11:
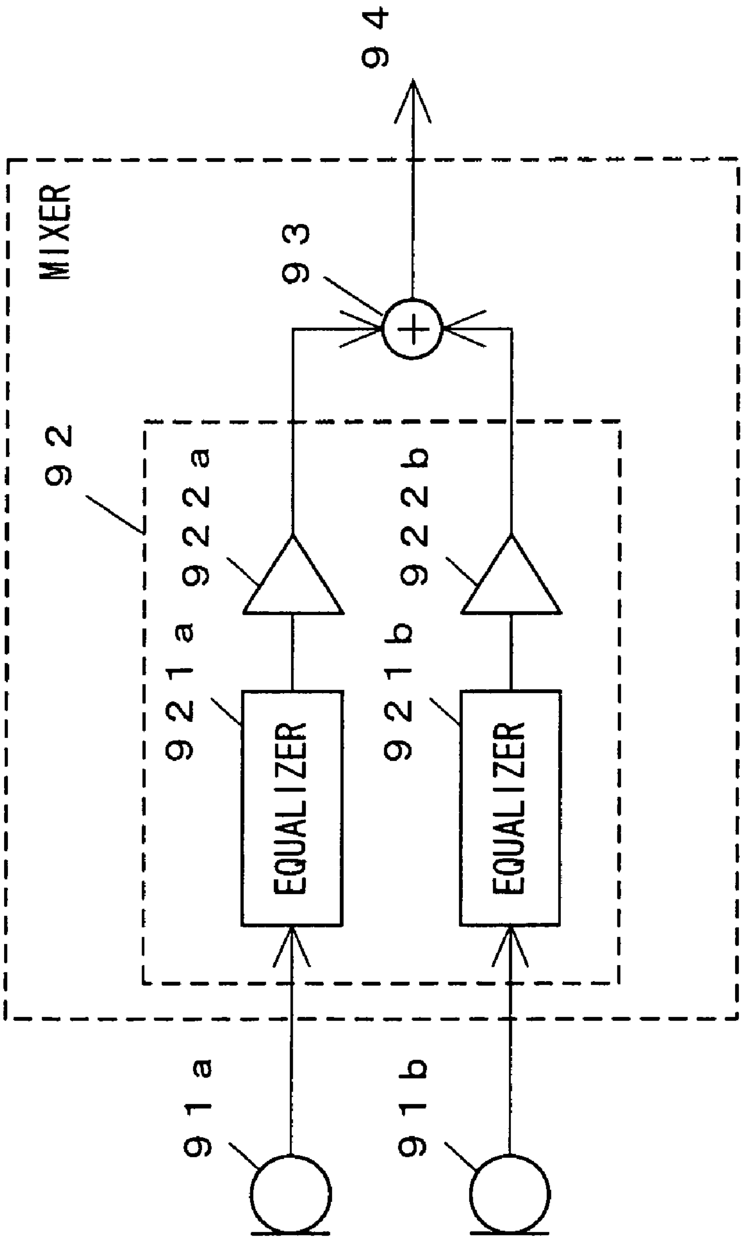
FIG. 11 is a block diagram illustrating an exemplary configuration of a sound characteristic adjusting section 92 and a sound mixing section 93.
Figure 12:
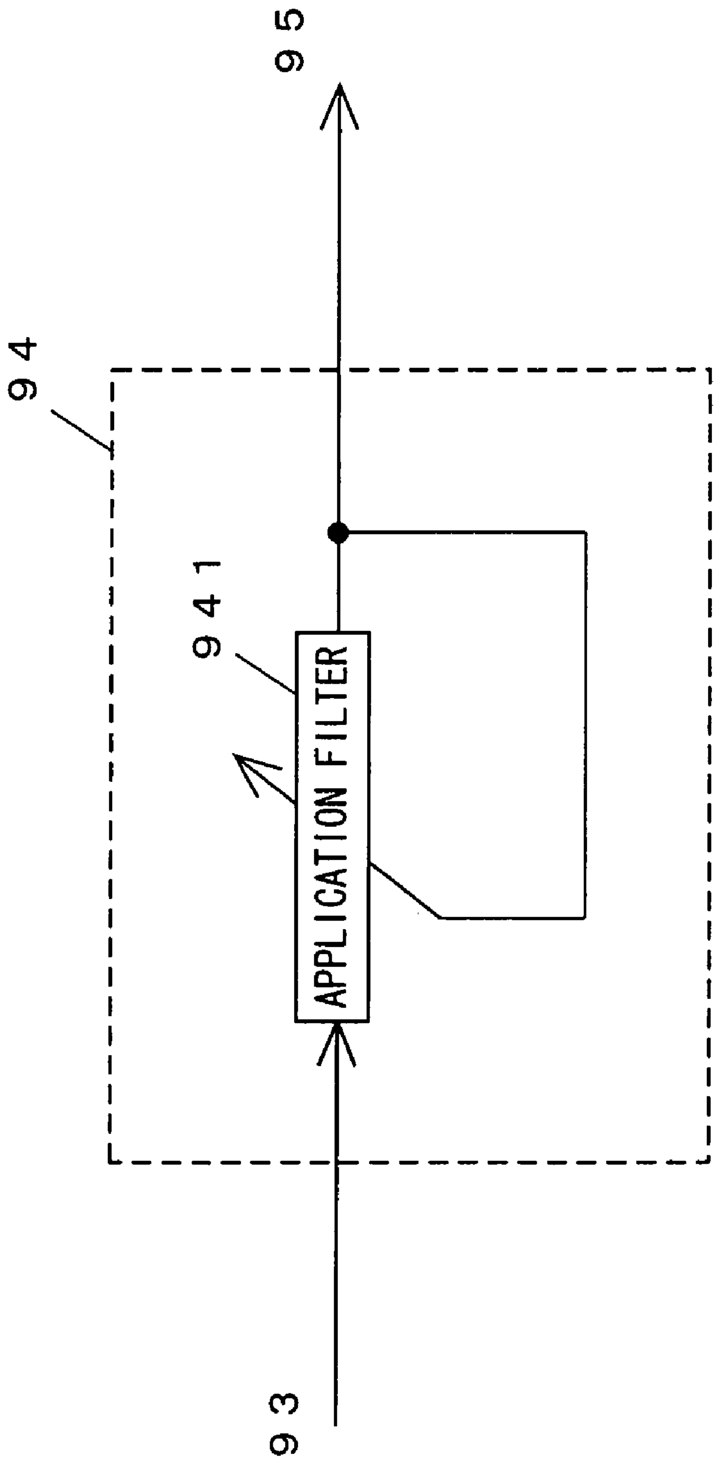
FIG. 12 is a block diagram illustrating an exemplary configuration of a howling suppressing section 94 in which an application filter 94 is used.

With reference to FIG. 8 and FIG. 9, a howling warning device, in which a howling detection method according to a third embodiment of the present invention is adapted, will be described. FIG. 8 is a block diagram illustrating an exemplary configuration of the howling warning device. In FIG. 8, the howling warning device includes the first microphone 11*a*, the second microphone 11*b*, the sound characteristic adjusting section 12, the sound mixing section 13, the level detecting section 14, the word ending detecting section 15, the dominance ratio calculating section 16, the speaker 18, and a howling warning section 31.

FIG. 9 is a block diagram illustrating an exemplary configuration of the howling warning device in which the howling occurrence detecting section 21 is used. In FIG. 9, the howling warning device includes the first microphone 11*a*, the second microphone 11*b*, the sound characteristic adjusting section 12, the sound mixing section 13, the level detecting section 14, the howling occurrence detecting section 21, the dominance ratio calculating section 16, the speaker 18, and the howling warning section 31. As shown in FIG. 8 and FIG. 9, the present embodiment is different from the aforementioned first and second embodiments in that the howling warning section 31 is provided in the present embodiment instead that the howling suppressing sections 17 and 22 are provided in the first and second embodiments, respectively. In other words, in the present embodiment, the howling warning section 31 is additionally provided in the aforementioned howling detection device according to the present invention. Hereinafter, the present embodiment will be described mainly with respect to this difference. Furthermore, the first microphone 11*a*, the second microphone 11*b*, the sound characteristic adjusting section 12, the sound mixing section 13, the level detecting section 14, the word ending detecting section 15, the dominance ratio calculating section 16, the howling occurrence detecting section 21 and the speaker 18 are the same as the respective elements described in the first and second embodiments above. Thus, like reference numerals will be denoted and detailed descriptions thereof will be omitted.

In FIG. 8, the howling warning section 31 warns the user of any of the sound signals which has a risk of a howling occurrence, in accordance with the dominance ratio, in the word ending section, which is calculated by the dominance ratio calculating section 16. As display means of warning the user, for example, lamps are respectively provided with a plurality of channels included in a mixer which adjusts frequency characteristics and gain characteristics of sound signals, so as to cause any of the lamps of the channels of the sound signals which has a risk of a howling occurrence to be blinked. Alternatively, for example, one lamp of the channel of the sound signal having the highest dominance ratio (having the highest risk of the howling occurrence) is caused to be blinked. Alternatively, for example, the lamps of the two or more channels having high dominance ratios may be caused to be blinked. In the case where the dominance ratio is calculated for each frequency band, a lamp is provided for the each frequency band of each of the channels, and the lamp may be caused to be blinked for the each frequency band. Furthermore, the display means is not limited to the above-mentioned example using a lamp. The display means may be means for displaying a warning on a screen, or the display means may be other means. Still furthermore, the howling warning section 31 may not only issue a warning but also cause the sound characteristic adjusting section 12 to automatically change a sound characteristic (decreasing a gain, for example) in accordance with the warning, thereby preventing howling from occurring.

Alternatively, as shown in FIG. 9, the user may be warned of any of the sound signals which has a risk of a howling occurrence, in accordance with the dominance ratio at the time of the initial occurrence of howling. In FIG. 9, the howling warning section 31 is referred to the dominance ratio at the time of the initial occurrence of howling, the dominant ratio being calculated by the dominance ratio calculating section 16, thereby making it possible to warn the user of any of the sound signals which currently causes the initial occurrence of howling.

As described above, in the present embodiment, the howling warning section 31 warns, in accordance with the dominance ratio calculated by the dominance ratio calculating section 16, the user of any of the sound signals which has the risk of the howling occurrence or any of the sound signals which currently causes the initial occurrence of howling. Thus, even if a plurality of sound signals are inputted, it becomes possible to allow the user to perform a mixing operation for each of the sound signals so as to prevent howling from occurring.

Among the respective elements described in the first to third embodiments above, at least a portion of the elements can be realized by an integrated circuit. Hereinafter, a detailed example will be described for each of the embodiments. The level detecting section 14, the word ending detecting section 15, the dominance ratio calculating section 16 and the howling suppressing section 17, which are all described in the first embodiment above, can be realized by an integrated circuit, for example, in which sound signals outputted from the sound characteristic adjusting section 12 (Xm1(*t*) and Xm2(*t*) in FIG. 1), a sound signal outputted from the sound mixing section 13 (Xm(t) in FIG. 1) and a noise reference signal (Y(t) in FIG. 1) are received, and a result of a signal processing having been performed on the received signals is amplified as necessary by an amplification section or the like so as to be outputted to the speaker 18. The level detecting section 14, the howling occurrence detecting section 21, the dominance ratio calculating section 16 and the howling suppressing section 17, which are all described in the second embodiment above, can be realized by an integrated circuit, for example, in which sound signals outputted from the sound characteristic adjusting section 12 (Xm1(*t*) and Xm2(*t*) in FIG. 6), a sound signal outputted from a sound mixing section 13 (Xm(t) in FIG. 6) and a noise reference signal (Y(t) in FIG. 6) are received, and a result of a signal processing having been performed on the received signals is amplified as necessary by an amplification section or the like so as to be outputted to the speaker 18. The level detecting section 14, the word ending detecting section 15 and the dominance ratio calculating section 16, which are all described in FIG. 8 of the third embodiment above, are realized by an integrated circuit, for example, in which sound signals outputted from the sound characteristic adjusting section 12 (Xm1(*t*) and Xm2(*t*) in FIG. 8) and a sound signal outputted from the sound mixing section 13 (Xm(t) in FIG. 8) are received, and a result of a signal processing having been performed on the received signals is outputted to the howling warning section 31. The level detecting section 14, the howling occurrence detecting section 21 and the dominance ratio calculating section 16, which are all described in FIG. 9 of the third embodiment above, are realized by an integrated circuit, for example, in which sound signals outputted from the sound characteristic adjusting section 12 (Xm1(*t*) and Xm2(*t*) in FIG. 9) and a sound signal outputted from the sound mixing section 13 (Xm(t) in FIG. 9) are received, and a result of a signal processing having been performed on the received signals is outputted to the howling warning section 31. Thus, in the aforementioned first to third embodiments, electric circuits functioning as the respective elements described above are integrated into a small package, so as to form a sound signal processing circuit DSP (Digital Signal Processor), for example, thereby making it possible to realize the present invention.

INDUSTRIAL APPLICABILITY

A howling detection device and method according to the present invention is applicable to a sound-intensifying system, a PA device having a sound mixing function, and the like, which mix and intensify a plurality of sound signals, and which are capable of detecting a risk of a howling occurrence for each of the sound signals by calculating a dominance ratio.

The invention claimed is:

1. A howling detection device for detecting a dominance ratio, which indicates a risk of howling to occur when a mixed signal obtained by a sound mixing section for mixing a plurality of sound signals respectively collected by a plurality of microphones is outputted by a speaker, the howling detection device comprising:

a level detecting section configured to respectively detect levels of the plurality of sound signals;

a word ending detecting section configured to compare, in a same time domain, the mixed signal with a signal regarding a sound to be outputted by the speaker as a noise reference signal and detect a time period, as a word ending section, during which the mixed signal is inputted after the noise reference signal falls;

a dominance ratio calculating section configured to extract only a level of the word ending section from each of the levels of the plurality of sound signals detected by the level detecting section and calculate, as a dominance ratio, a ratio of the extracted level of each of the sound signals to a sum of extracted levels of the plurality of sound signals; and a howling suppressing section configured to subtract, from the mixed signal, a signal having a same component as a signal included in the word ending section, based on a transfer characteristic calculated by using the dominance ratio, and output the obtained signal to the speaker.

2. The howling detection device according to claim 1, wherein the howling suppressing section sets a function used for estimating the mixed signal excluding the signal having the same component as the signal included in the word ending section, updates the sum of the levels of the plurality of sound signals in accordance with the dominance ratio, and calculates the transfer characteristic by multiplying the function by a change rate of an updated sum of the levels of the plurality of sound signals to the sum of the levels of the plurality of sound signals.

3. The howling detection device according to claim 2, wherein the howling suppressing section updates the sum of the levels of the plurality of sound signals by updating one or more of the levels of the sound signals, which indicate a relatively high dominance ratio.

4. The howling detection device according to claim 2, wherein the howling suppressing section updates the sum of the levels of the plurality of sound signals by updating only one of the levels of the sound signals, which indicates the highest dominance ratio.

5. The howling detection device according to claim 1, wherein the level detecting section outputs a power spectrum representation of each of the plurality of sound signals.

6. A howling detection device for detecting a dominance ratio, which indicates a risk of howling to occur when a mixed signal obtained by a sound mixing section for mixing a plurality of sound signals respectively collected by a plurality of microphones is outputted by a speaker the howling detection device comprising:

a level detecting section configured to respectively detect levels of the plurality of sound signals;

a word ending detecting section configured to compare, in a same time domain, the mixed signal with a signal regarding a sound to be outputted by the speaker as a noise reference signal and detect a time period, as a word ending section, during which the mixed signal is inputted after the noise reference signal falls;

a dominance ratio calculating section configured to extract only a level of the word ending section from each of the levels of the plurality of sound signals detected by the level detecting section and calculate, as a dominance ratio, a ratio of the extracted level of each of the sound signals to a sum of extracted levels of the plurality of sound signals; and a howling warning section configured to specify one or more of the sound signals, which indicate a relatively high dominance ratio calculated by the dominance ratio calculating section, and notifying a user which of the one or more sound signals indicate a relatively high dominance ratio.

7. The howling detection device according to claim 6, wherein the level detecting section outputs a power spectrum representation of each of the plurality of sound signals.

8. A howling detection device for detecting a dominance ratio, which indicates a risk of howling to occur when a mixed signal obtained by a sound mixing section for mixing a plurality of sound signals respectively collected by a plurality of microphones is outputted by a speaker the howling detection device comprising:

a level detecting section configured to respectively detect levels of the plurality of sound signals;

a word ending detecting section configured to compare, in a same time domain, the mixed signal with a signal regarding a sound to be outputted by the speaker as a noise reference signal and detect a time period, as a word ending section, during which the mixed signal is inputted after the noise reference signal falls;

a dominance ratio calculating section configured to extract only a level of the word ending section from each of the levels of the plurality of sound signals detected by the level detecting section and calculate, as a dominance ratio, a ratio of the extracted level of each of the sound signals to a sum of extracted levels of the plurality of sound signals; and a howling warning section for specifying one of the sound signals, which indicates the highest dominance ratio calculated by the dominance ratio calculating section, and notifying a user which one of the sound signals indicates the highest dominance ratio.

9. The howling detection device according to claim 8, wherein the level detecting section outputs a power spectrum representation of each of the plurality of sound signals.

10. A howling detection device for detecting a dominance ratio, which indicates a risk of howling to occur when a mixed signal obtained by a sound mixing section for mixing a plurality of sound signals respectively collected by a plurality of microphones is outputted by a speaker, the howling detection device comprising:

a level detecting section configured to respectively detect levels of the plurality of sound signals;

a word ending detecting section configured to compare, in a same time domain, the mixed signal with a signal regarding a sound to be outputted by the speaker as a noise reference signal and detect a time period, as a word ending section, during which the mixed signal is inputted after the noise reference signal falls;

a howling occurrence detecting section configured to calculate a power spectrum of the mixed signal and detect a howling occurrence based on a change in the power spectrum;

a dominance ratio calculating section configured to extract, from the levels of the plurality of sound signals detected by the level detecting section, only a level of the sound signal detected when a howling occurrence has been detected and calculate, as a dominance ratio, a ratio of the extracted level of each of the sound signals to a sum of extracted levels of the plurality of sound signals; and a howling suppressing section configured to subtract, from the mixed signal, a signal having a same component as a signal included in the word ending section, based on a transfer characteristic calculated by using the dominance ratio, and output the obtained signal to the speaker.

11. The howling detection device according to claim 10, wherein the howling suppressing section sets, when the word ending section is detected, a function used for estimating the mixed signal excluding the signal having the same component as the signal included in the word ending section, updates the sum of the levels of the plurality of sound signals in accordance with the dominance ratio, and calculates, when the howling occurrence is detected, the transfer characteristic by multiplying the function by a change rate of an updated sum of the levels of the plurality of sound signals to the sum of the levels of the plurality of sound signals.

12. The howling detection device according to claim 11, wherein the howling suppressing section updates the sum of the levels of the plurality of sound signals by updating one or more of the levels of the sound signals, which indicate a relatively high dominance ratio.

13. The howling detection device according to claim 11, wherein the howling suppressing section updates the sum of the levels of the plurality of sound signals by updating only one of the levels of the sound signals, which indicates the highest dominance ratio.

14. The howling detection device according to claim 10, wherein the level detecting section outputs a power spectrum representation of each of the plurality of sound signals.

15. A howling detection device for detecting a dominance ratio, which indicates a risk of howling to occur when a mixed signal obtained by a sound mixing section for mixing a plurality of sound signals respectively collected by a plurality of microphones is outputted by a speaker the howling detection device comprising:

a level detecting section configured to respectively detect levels of the plurality of sound signals;

a howling occurrence detecting section configured to calculate a power spectrum of the mixed signal and detect a howling occurrence based on a change in the power spectrum;

a dominance ratio calculating section configured to extract, from the levels of the plurality of sound signals detected by the level detecting section, only a level of the sound signal detected when a howling occurrence has been detected and calculate, as a dominance ratio, a ratio of the extracted level of each of the sound signals to a sum of extracted levels of the plurality of sound signals; and a howling warning section configured to specify one or more of the sound signals, which indicate a relatively high dominance ratio calculated by the dominance ratio calculating section, and notifying a user which of the one or more sound signals indicate a relatively high dominance ratio.

16. The howling detection device according to claim 15, wherein the level detecting section outputs a power spectrum representation of each of the plurality of sound signals.

17. A howling detection device for detecting a dominance ratio, which indicates a risk of howling to occur when a mixed signal obtained by a sound mixing section for mixing a plurality of sound signals respectively collected by a plurality of microphones is outputted by a speaker the howling detection device comprising:

a level detecting section configured to respectively detect levels of the plurality of sound signals;

a howling occurrence detecting section configured to calculate a power spectrum of the mixed signal and detect a howling occurrence based on a change in the power spectrum;

a dominance ratio calculating section configured to extract, from the levels of the plurality of sound signals detected by the level detecting section, only a level of the sound signal detected when a howling occurrence has been detected and calculate, as a dominance ratio, a ratio of the extracted level of each of the sound signals to a sum of extracted levels of the plurality of sound signals; and a howling warning section for specifying one of the sound signals, which indicates the highest dominance ratio calculated by the dominance ratio calculating section, and notifying a user which one of the sound signals indicates the highest dominance ratio.

18. The howling detection device according to claim 17, wherein the level detecting section outputs a power spectrum representation of each of the plurality of sound signals.

19. A howling detection method for detecting a dominance ratio, which indicates a risk of howling to occur when a mixed signal obtained by a sound mixing section for mixing a plurality of sound signals respectively collected by a plurality of microphones is outputted by a speaker, the howling detection method comprising:

a level detecting device performing a step of respectively detecting levels of the plurality of sound signals;

a word ending detecting device performing a step of comparing, in a same time domain, the mixed signal with a signal regarding a sound to be intensified as a noise reference signal and detecting a time period, as a word ending section, during which the mixed signal is inputted after the noise reference signal falls;

a dominance ratio calculating device performing a step of extracting only a level of the word ending section from each of the levels of the plurality of sound signals, the levels detected by the level detecting section, and calculating, as a dominance ratio, a ratio of the extracted level of each of the sound signals to a sum of extracted levels of the plurality of sound signals; and a howling suppressing device performing a step of subtracting, from the mixed signal, a signal having a same component as a signal included in the word ending section, based on a transfer characteristic calculated by using the dominance ratio, and outputting the obtained signal to the speaker.

20. A howling detection method for detecting a dominance ratio, which indicates a risk of howling to occur when a mixed signal obtained by a sound mixing section for mixing a plurality of sound signals respectively collected by a plurality of microphones is outputted by a speaker, the howling detection method comprising:

a level detecting device performing a step of respectively detecting levels of the plurality of sound signals;

a word ending detecting device performing a step of comparing, in a same time domain, the mixed signal with a signal regarding a sound to be intensified as a noise reference signal and detecting a time period, as a word ending section, during which the mixed signal is inputted after the noise reference signal falls;

a howling occurrence detecting device performing a step of calculating a power spectrum of the mixed signal and detecting a howling occurrence based on a change in the power spectrum;

a dominance ratio calculating device performing a step of extracting, from the levels of the plurality of sound signals detected by the level detecting section, only a level of the sound signal detected when a howling occurrence has been detected and calculating, as a dominance ratio, a ratio of the extracted level of each of the sound signals to a sum of extracted levels of the plurality of sound signals; and a howling suppressing device performing a step of subtracting, from the mixed signal, a signal having a same component as a signal included in the word ending section, based on a transfer characteristic calculated by using the dominance ratio, and outputting the obtained signal to the speaker.

* * * * *